US008725133B2

(12) United States Patent  
Park et al.

(10) Patent No.: US 8,725,133 B2  
(45) Date of Patent: May 13, 2014

(54) METHOD OF TRANSMITTING AND RECEIVING DATA, DISPLAY DEVICE AND MOBILE TERMINAL USING THE SAME

(75) Inventors: Jinyung Park, Seoul (KR); Junho Park, Seoul (KR); Rajesh Nagaraja Rao, Seoul (KR); Junsoo Park, Seoul (KR); Sungjong Park, Seoul (KR); Basheerudeen Fz, Seoul (KR); Jongcheol Kim, Seoul (KR); Jongsoon Park, Seoul (KR)

(73) Assignee: LG Electronics Inc., Seoul (KR)

( * ) Notice: Subject to any disclaimer, the term of this patent is extended or adjusted under 35 U.S.C. 154(b) by 0 days.

(21) Appl. No.: 13/367,403

(22) Filed: Feb. 7, 2012

(65) Prior Publication Data

US 2012/0208514 A1    Aug. 16, 2012

Related U.S. Application Data

(60) Provisional application No. 61/442,810, filed on Feb. 15, 2011.

(30) Foreign Application Priority Data

Jun. 24, 2011  (KR) .................... 10-2011-0061963

(51) Int. Cl.  
    *H04H 40/00*     (2008.01)  
    *H04M 3/00*     (2006.01)  
    *G06F 3/00*     (2006.01)

(52) U.S. Cl.  
    USPC .......................... 455/418; 455/3.06; 715/717

(58) Field of Classification Search  
    USPC ................ 715/716–718; 455/3.06, 418–420  
    See application file for complete search history.

(56) References Cited

U.S. PATENT DOCUMENTS

| | | | |
|---|---|---|---|
| 2005/0198029 A1 | 9/2005 | Pohja | |
| 2008/0039212 A1 | 2/2008 | Ahlgren | |
| 2008/0195735 A1* | 8/2008 | Hodges et al. | 709/227 |
| 2009/0132923 A1 | 5/2009 | Han | |
| 2009/0210898 A1 | 8/2009 | Childress | |
| 2010/0107219 A1 | 4/2010 | Thompson et al. | |
| 2010/0257473 A1* | 10/2010 | Kang | 715/769 |
| 2010/0313143 A1 | 12/2010 | Jung | |

FOREIGN PATENT DOCUMENTS

CN      1914865 A      2/2007

(Continued)

OTHER PUBLICATIONS

European Search Report dated Jul. 9, 2012, for Application No. 12000895, 8 pages.  
Steve Hodges et al.; "ThinSight: Versatile Multi-Touch Sensing for Thin Form-Factor Displays", Conference on Human Factors in Computing Systems—Proceedings of the Sigchi Conference on Human Factors in Computing Systems 2007, Oct. 7, 2007, pp. 259-268, XP007905450.

(Continued)

*Primary Examiner* — Jinsong Hu  
*Assistant Examiner* — Erica Navar  
(74) *Attorney, Agent, or Firm* — Fish & Richardson P.C.

(57) ABSTRACT

A method of transmitting and receiving data between a mobile terminal and a display device is provided. The method establishes network connection for communication with the mobile terminal, detects a touch location of the mobile terminal when the mobile terminal touches the display device, transmits and receives data to and from the mobile terminal over the connected network, and processes the transmitted and received data according to the detected touch location of the mobile terminal.

15 Claims, 33 Drawing Sheets

(56) References Cited

FOREIGN PATENT DOCUMENTS

| CN | 101442463 A | 5/2009 |
|---|---|---|
| CN | 101491066 A | 7/2009 |
| CN | 101924675 A | 12/2010 |
| CN | 101946494 A | 1/2011 |
| KR | 10-2006-0082168 A | 7/2006 |
| KR | 10-2009-0084634 A | 8/2009 |
| KR | 10-2010-0109686 A | 10/2010 |
| WO | WO 2010/096128 A1 | 8/2010 |

OTHER PUBLICATIONS

Korean Office Action dated Oct. 29, 2012 for Application No. 10-2011-0061963 with English Translation, 10 pages.
Chinese Office Action dated Nov. 12, 2013 for Application No. 201210032992.7, with English Translation, 15 pages.
Chinese Search Report dated Nov. 12, 2013 for Application No. 201210032992.7, with English Translation, 6 pages.

* cited by examiner (a)            (b)

(a)

(b)

(c)

(a)

(b)

(c)

(a)

(b)

(c)

(a)

(b)

(c)

(a)

(b)

(a)

(b)

(a)          (b)

METHOD OF TRANSMITTING AND RECEIVING DATA, DISPLAY DEVICE AND MOBILE TERMINAL USING THE SAME

CROSS-REFERENCE TO RELATED APPLICATIONS

The present application claims priority under 35 U.S.C. 119 and 35 U.S.C. 365 to Korean Patent Application No. 10-2011-0061963, filed on Jun. 24, 2011, and U.S. Patent Application Ser. No. 61/442,810, filed on Feb. 15, 2011, which are hereby incorporated by reference in their entirety.

BACKGROUND

The present disclosure relates to a method of transmitting and receiving data between a display device and a mobile terminal.

Mobile terminals are portable devices that are capable of carrying and have at least one of: a function of performing voice call and video call; a function of inputting/outputting information; and a function of storing data.

As the functions of the mobile terminals are further diversified, the mobile terminals progressively have a plurality of complicated functions such as a function of capturing a picture or a moving image, a function of replaying a music file or a video file, a function of playing a game, a function of receiving broadcast, a function of accessing wireless Internet, etc. That is, the mobile terminals are realized as multimedia players.

SUMMARY

Embodiments provide a user interface which can efficiently control data communication between a display device and a mobile terminal.

In one general aspect, some embodiments feature a method of facilitating communications between at least one mobile terminal and a display device. The method comprises determining whether a mobile terminal and a display device that is physically distinct of the mobile terminal are locationally proximate, and based on a determination that the mobile terminal and the display device are locationally proximate, identifying a first portion of a screen of the display device where the mobile terminal has a high locational proximity relative to at least one other portion of the screen. The method includes determining whether the identified first portion of the screen is displaying a representation of content data. Based on the determination that the identified first portion is displaying the representation of the content data, the method involves accessing the content data at the first portion of the display device, transferring the accessed content data from the display device to the mobile terminal, and based upon the transfer of the content data, updating the representation of the content data on the display device.

One or more embodiments can include one or more of the optional features. The method can include wirelessly communicating the content data between the mobile terminal and the display device. The determination that the mobile terminal is locationally proximate can involve having the mobile terminal touching the first portion of the screen of the display device. The determination that the mobile terminal is locationally proximate can include the mobile terminal being located within a predefined distance of the display device. The method can involve determining information for at least one of a location of the mobile terminal with respect to the display device and an orientation of the mobile terminal with respect to the display device. The method can involve processing the content data related to at least one of the location and orientation of the mobile terminal with respect to the display device. The display device can be untethered with respect to the mobile terminal, where the display device and the mobile terminal can be electrically disconnected with respect to each other. The method can involve wirelessly transferring the content data based on at least one of a location and an orientation of the mobile terminal with respect to the display device. The method can involve the following features: determining whether the orientation of the mobile terminal has at least one of a first side facing the screen of the display device and a second side facing away from the screen of the display device, wherein the first side of the mobile terminal comprises a display screen, and responsive to determining that the orientation of the mobile terminal has the second side facing away the screen of the display device, performing the transferring of the content data from the display device to the mobile terminal. The transfer of the content data from the display device to the mobile terminal can commence when the mobile terminal ceases to be within the locational proximity of the display device. The transfer of the content data from the display device to the mobile terminal can commence when the mobile terminal ceases to touch the screen of the display device. The method can involve performing a copy operation, where the copy operation can involve copying the content data from a storage unit of the display device to the mobile terminal. The method can involve performing a cut operation, where the cut operation can include removing the display of the representation of the content data from the first portion of the screen of the display device. The method can involve deleting the content data from a storage unit of the display device. The method may involve the following operations: transferring a copy of the content data from the display device to the mobile terminal, and deleting the content data from a storage unit of the display device immediately after the content data is transferred to the mobile terminal. The content data can include at least one of video, text, audio, a photograph, a document file, a game, a representation of a telephone call or a video call, and a software application. The determination of the first portion of the screen of the display device where the mobile terminal is locationally proximate with the display device can involve detecting a touch location of the display device where a rear side of the mobile terminal touches the display device. The determination of the first portion of the screen of the display device where the mobile terminal is locationally proximate with the display device can involve determining a touch location of the mobile terminal with respect to the first portion of the screen of the display device by using at least one of a touch sensor, an Near Field Communication (NFC) tag, and a catadioptric camera in the display device. The determination of the touch location can involve detecting a proximity of at least one NFC tag, from which an NFC reader comprised in the mobile terminal has read information, from among a plurality of NFC tags disposed in a rear side of a screen portion of the display device, and determining the touch location of the mobile terminal on the display device based on a location of the detected NFC tag. The determination of the touch location can involve determining the touch location of the mobile terminal by using respective images captured by a plurality of catadioptric cameras on the display device that are located at front edges of the screen of the display device.

In another general aspect, other embodiments can involve a method of facilitating communications between at least one mobile terminal and a display device. The method includes determining whether a mobile terminal and a display device that is physically distinct of the mobile terminal are locationally proximate, and based on a determination that the mobile terminal and the display device are locationally proximate, identifying a first portion of a screen of the display device where the mobile terminal has a high locational proximity relative to at least one other portion of the screen. The method involves determining whether the identified first portion of the screen is displaying a representation of content data, and based on the determination that the first portion of the screen is not displaying the content data, detecting a user input to move content data represented at a second portion of the screen of the display device to the identified first portion of the screen of the display device. In response to detecting the user input, the method involves accessing the content data that is represented at the second portion of the screen of the display device, transferring the accessed content data from the display device to the mobile terminal, and updating the representation of the content data on the display device.

One or more embodiments can include one or more of the optional features. The user input can include a touch command on the screen of the display device. The method can involve wirelessly communicating the content data between the mobile terminal and the display device. The determination that the mobile terminal is locationally proximate can involve having the mobile terminal to physically touch the first portion of the screen of the display device. The determination that the mobile terminal is locationally proximate can involve the mobile terminal being located within a threshold distance or a predefined distance of the display device. The method can involve determining information for at least one of a location of the mobile terminal with respect to the display device and an orientation of the mobile terminal with respect to the display device, and wirelessly transferring the content data based on at least one of a location and an orientation of the mobile terminal with respect to the display device. The method can involve determining whether the orientation of the mobile terminal has at least one of a first side facing the screen of the display device and a second side facing away from the screen of the display device, where the first side of the mobile terminal includes a display screen, and responsive to determining that the orientation of the mobile terminal has the second side facing away the display of the display device, performing the identification of the first portion of the screen. The transfer of the content data from the display device to the mobile terminal can commence when the user input is detected. The method can involve performing a copy operation, where the copy operation can include copying the content data from a storage unit of the display device to the mobile terminal. The method can involve: detecting a second user input to move second content data represented at a third portion of the screen of the display device to the identified first portion of the screen of the display device; and in response to detecting the second user input: accessing the second content data that is represented at the third portion of the screen of the display device; transferring the accessed second content data from the display device to the mobile terminal; and updating the representation of the second content data on the display device. The content data can include at least one of video, text, audio, a photograph, a document file, a game, a representation of a telephone call or a video call, and a software application.

In another general aspect, other embodiments can involve a method of facilitating communications between at least one mobile terminal and a display device. The method includes receiving a user input for a selection of content data that is represented at a first portion of a screen of a display device, determining whether a mobile terminal and a display device that is physically distinct of the mobile terminal are locationally proximate, and based on a determination that the mobile terminal and the display device are locationally proximate, identifying whether the mobile terminal has a high locational proximity at the first portion of the screen of the display device relative to at least one other portion of the screen. The method involves based on identifying the mobile terminal having the high locational proximity at the first portion of the screen of the display device relative to at least one other portion of the screen, transferring the content data from the display device to the mobile terminal, and based upon the transfer of the content data, updating the representation of the content data on the display device.

One or more embodiments can include one or more of the optional features. The user input can include a touch command on the screen of the display device. The method can involve wirelessly communicating the content data between the mobile terminal and the display device. The method can involve determining that the mobile terminal is locationally proximate by having the mobile terminal to touch the first portion of the screen of the display device. Determining that the mobile terminal is locationally proximate can involve having the mobile terminal being located within a predefined distance of the display device at the first portion of the screen of the display device.

In one embodiment, a method of transmitting and receiving data to and from a mobile terminal in a display device connectable to a wireless network includes: establishing network connection for communication with the mobile terminal; detecting a touch location of the mobile terminal when the mobile terminal touches the display device; transmitting and receiving data to and from the mobile terminal over the connected network; and processing the transmitted and received data according to the detected touch location of the mobile terminal.

In another embodiment, a display device, which transmits and receives data to and from a mobile terminal over a wireless network, includes: a network interface establishing network connection for communication with the mobile terminal, and transmitting and receiving data to and from the mobile terminal over the connected network when the mobile terminal touches the display device; and a control unit processing the transmitted and received data according to whether content is displayed at a location of a screen of the display device which is touched by the mobile terminal.

In further another embodiment, the method of transmitting and receiving data may be implemented with a computer-readable storage medium storing a program for executing in a computer.

In still further another embodiment, a program for executing the method of transmitting and receiving data may be stored and installed in the display device or the mobile terminal.

The details of one or more embodiments are set forth in the accompanying drawings and the description below. Other features will be apparent from the description and drawings, and from the claims.

DETAILED DESCRIPTION OF THE EMBODIMENTS

Hereinafter, a method of transmitting and receiving data, a display device and a mobile terminal using the same, according to embodiments, will be described in detail with reference to the accompanying drawings.

Figure 1:
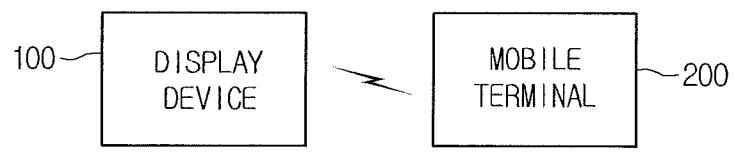
FIG. 1 is a block diagram illustrating a configuration of a system for transmitting and receiving data.

FIG. 1 is a block diagram illustrating a configuration of a system for transmitting and receiving data, according to an embodiment. The system for transmitting and receiving data may include a display device 100 and a mobile terminal 200.

Referring to FIG. 1, the display device 100 may be an image display device such as a television (TV), a monitor, a notebook computer, or a tablet Personal Computer (PC) that may be connected to the mobile terminal 200 over a wireless network.

For example, the display device 100 may be a network TV, an Internet Protocol TV (IPTV), a Hybrid Broadcast Broadband TV (HBBTV), or a smart TV that may perform various user-friendly functions as various applications are freely added or deleted to/from a general Operating System (OS) Kernel.

The mobile terminal 200 is a device that may be connected to the display device 100 to transmit/receive data over a wireless network. The mobile terminal 200 has a screen portion smaller than that of the display device 100, and thus may be a device that is capable of carrying and free moving due to its small size and light weight.

For example, the mobile terminal 200 may be one of various devices, which may output an image and sound, such as portable phones, smart phones, tablet PCs, digital broadcasting terminals, Personal Digital Assistants (PDAs), Portable Multimedia Players (PMPs), Internet phones such as SoIP, navigation devices, and MP3 players.

The display device 100 and the mobile terminal 200 may be connected to each other to transmit/receive data in one of various wireless communication schemes such as Wireless LAN (WiFi), WiFi direct, WiFi display, Blutooth, ZigBee, binary Code Division Multiple Access (CDMA), Wireless broadband (Wibro), World Interoperability for Microwave Access (Wimax), High Speed Downlink Packet Access (HSDPA), Universal Plug and Play (UPnP)/Digital Living Network Alliance (DLBNA), Ultra wide band (UWB)/wireless Universal Serial Bus (USB).

The display device 100 and the mobile terminal 200 may share content by respectively transmitting/receiving their stored data in the above-described wireless communication scheme.

The content may be real-time broadcast, a movie, music, a photograph, a document file, Content On Demand (COD), a game, news, video call, an application, or the like.

A communication scheme between the display device 100 and the mobile terminal 200 for sharing the content may use various wireless networks enabling data communication, and thus is not limited to a specific communication scheme.

According to an embodiment, as the mobile terminal 200 touches the display device 100, the mobile terminal 200 and the display device 100 may transmit/receive data to share content. Some embodiments may involve determining whether a mobile terminal and a display device that is physically distinct of the mobile terminal are locationally proximate, and based on a determination that the mobile terminal and the display device are locationally proximate, identifying a first portion of a screen of the display device where the mobile terminal has a high locational proximity relative to at least one other portion of the screen. The determination that the mobile terminal is locationally proximate can involve having the mobile terminal touching the first portion of the screen of the display device. Alternatively, the determination that the mobile terminal is locationally proximate can include the mobile terminal being located within a threshold distance or a predefined distance of the display device.

For example, when a user moves the mobile terminal 200 in the direction of the display device 100 and thereby a portion of the mobile terminal 200 physically touches the screen portion of the display device 100, a touch between the display device 100 and the mobile terminal 200 is sensed, and thus, content data stored in the display device 100 may be transmitted to the mobile terminal 200 or content data stored in the mobile terminal 200 may be transmitted to the display device 100.

Hereinafter, a specific configuration of each of the display device 100 and the mobile terminal 200 will be described in detail with reference to FIGS. 2 and 3.

Figure 2:
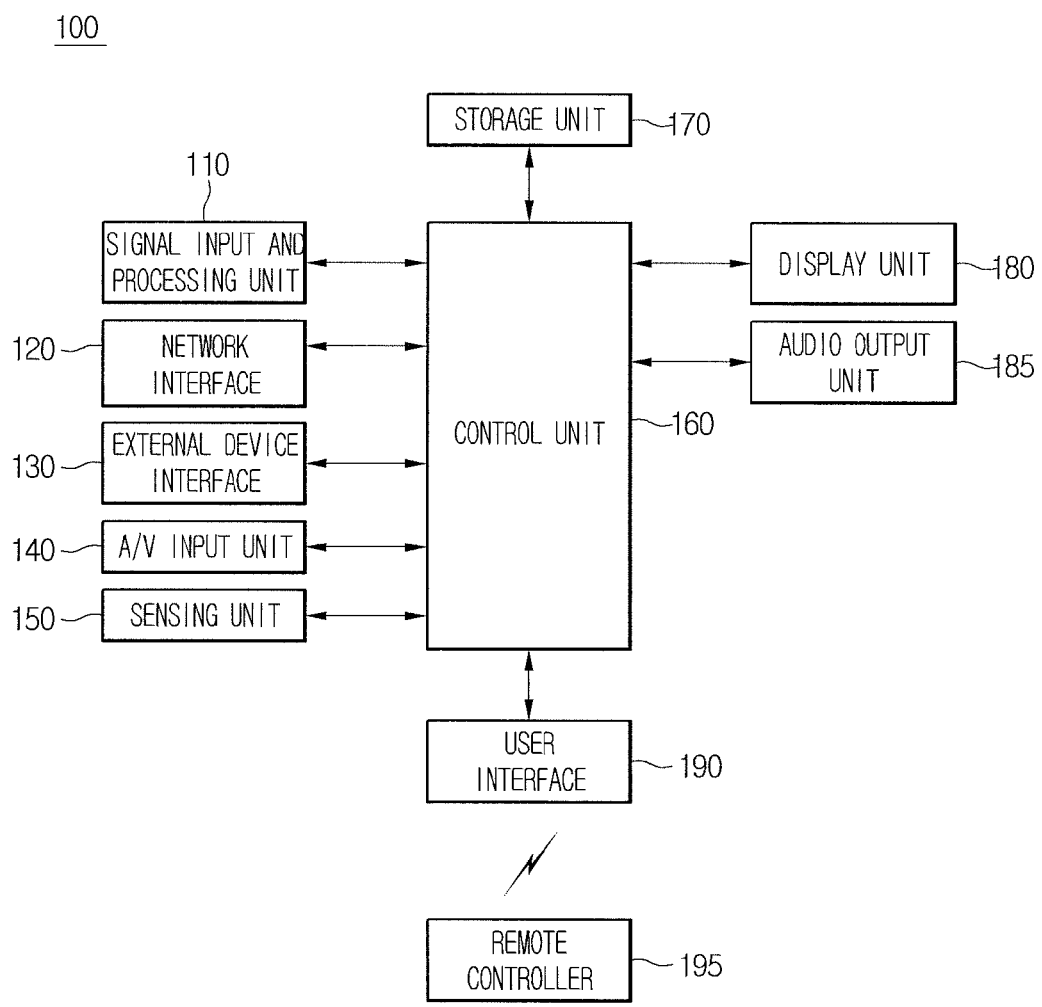
FIG. 2 is a block diagram illustrating a configuration of a display device according to an embodiment.

Referring to FIG. 2, the display device 100 may include a signal input and processing unit 110, a network interface 120, an external device interface 130, an A/V input unit 140, a sensing unit 150, a control unit 160, a storage unit 170, a display unit 180, an audio output unit 185, and a user interface 190.

The signal input and processing unit 180 receives and processes a signal from the outside, for example, may select a Radio Frequency (RF) broadcast signal, corresponding to a channel selected by the user or all pre-stored channels, from among a plurality of RF broadcast signals received through an antenna to receive the selected RF broadcast channel.

The network interface 120 may provide an interface for connecting the display device 100 to a wired/wireless network, and transmit/receive data to/from an external device in various wireless communication schemes that have been described above with reference to FIG. 1.

For example, the network interface 120 may establish wireless network connection with the mobile terminal 200 according to a communication standard such as WiFi or Bluetooth, and transmit/receive content data and information for data communication to/from the mobile terminal 200 over the connected network.

Moreover, the network interface 120 may include an Ethernet terminal for accessing Internet, and access a webpage through the Ethernet terminal to receive content data, provided from a specific content provider or a network provider, such as a movie, an advertisement, a game, VOD, a broadcast signal, or the like.

The external device interface 130 may connect an external device and the display unit 180, for example, access an external device such as a Digital Versatile Disk (DVD), Blu-ray, a game machine, a camera, a camcorder, or a computer (for example, a notebook computer) in a wireless way or a wired way.

In order for the display unit 180 to receive a video signal and an audio signal from an external device, the A/V input unit 140 may include a Composite Video Banking Sync (CVBS) terminal, a component terminal, an S-video terminal (analog), a Digital Visual Interface (DVI) terminal, a High Definition Multimedia Interface (HDMI) terminal, RGB terminals, and a D-SUB terminal.

The A/V input unit 140 may include a camera or a mike and acquire data corresponding to an image or voice of a user, and the acquired data may be delivered to the control unit 160.

The sensing unit 150 may include various sensors such as a touch sensor, a magnetometer, an accelerometer, a proximity sensor, a gyroscope sensor, an ambient light sensor, a colorimeter, and a tag, for sensing the current state of the display device 100.

For example, the control unit 160 may sense the touch of the mobile terminal 200 for transmission/reception of data or detect a location/direction where the mobile terminal 200 is touched, by using the measured value of a sensor included in the sensing unit 150

The control unit 160 controls an overall operation of the display device 100. The control unit 160 may demultiplex a data stream that is inputted through the signal input and processing unit 110, the network interface 120, or the external device interface 130, and process the demultiplexed signals, thereby generating and outputting a signal for output of video or audio.

The storage unit 170 may store a program for the signal processing and control of the control unit 160, and store the signal-processed video, audio, or data signal.

Moreover, the storage unit 170 may temporarily store a video, audio, or data signal that is inputted from the external device interface 130 or the network interface 120, or store information regarding a predetermined broadcast channel with a channel storage function.

The storage unit 170 may store an application or an application list that is inputted from the external device interface 130 or the network interface 120.

The storage unit 170, for example, may include at least one storage medium of a flash memory, a hard disk, a multimedia card micro type of memory, a card type of memory (for example, an SD or XD memory, etc.), a Random Access Memory (RAM), and a Read Only Memory (ROM, for example, Electrically Erasable and Programmable Read Only Memory (EEPROM), etc.).

The display device 100 may provide content data (for example, a moving image file, a still image file, a music file, a document file, an application file, or the like) stored in the storage unit 170 to a user by replaying the content data.

The user interface 190 delivers a signal inputted by the user to the control unit 160, or delivers a signal, inputted from the control unit 160, to the user.

For example, the user interface 190 may receive a control signal or a user input signal such as power-on/off, selection of a channel, or setting of a screen from a remote controller 195 in one of various communication schemes such as Bluetooth, Radio Frequency Identification (RFID), Infrared Data Association (IrDA), Ultra Wideband (UWB), Zigbee, and Digital Living Network Alliance (DLNA) and process the received signal. Alternatively, the user interface 190 may process the control signal from the control unit 160 in order for the control signal to be transmitted to the remote controller 195.

The control unit 160 may control the display unit 180 so as to display an image. For example, the control unit 160 may perform control such that the display unit 180 displays a broadcast image inputted through the signal input and processing unit 110, an external input image inputted through the external device interface 130, an image inputted through the network interface 120, or an image stored in the storage unit 170. An image displayed by the display unit 180 may be a still image or a moving image, and be a Two-Dimensional (2D) image or a Three-Dimensional (3D) image.

The display unit 180 may form a screen portion that is exposed to the front of the display device 100 for displaying an image.

The display unit 180 respectively converts an image signal, a data signal, and an On Screen Display (OSD) signal that have been processed by the control unit 160 into RGB signals to generate a driving signal. Alternatively, the display unit 180 respectively converts an image signal and a data signal, which are received through the external device interface 130 into RGB signals to generate a driving signal.

The display unit 180 may display an image in one of various display types such as Plasma Display Panel (PDP), Liquid Crystal Display (LCD), Organic Light Emitting Diode (OLED), flexible display, and 3D display. The display unit 180 may be configured with a touch screen and used as an input device instead of an output device.

The audio output unit 185 receives a signal (for example, a stereo signal, a 3.1 channel signal or a 5.1 channel signal) audio-processed by the control unit 160 to output audio.

The configuration of the display device according to an embodiment has been described above with reference to FIG. 2, but the present invention is not limited thereto. As another example, the elements of FIG. 2 are partially integrated or omitted, or another element may be added, according to the main function or specification of a display device.

Figure 3:
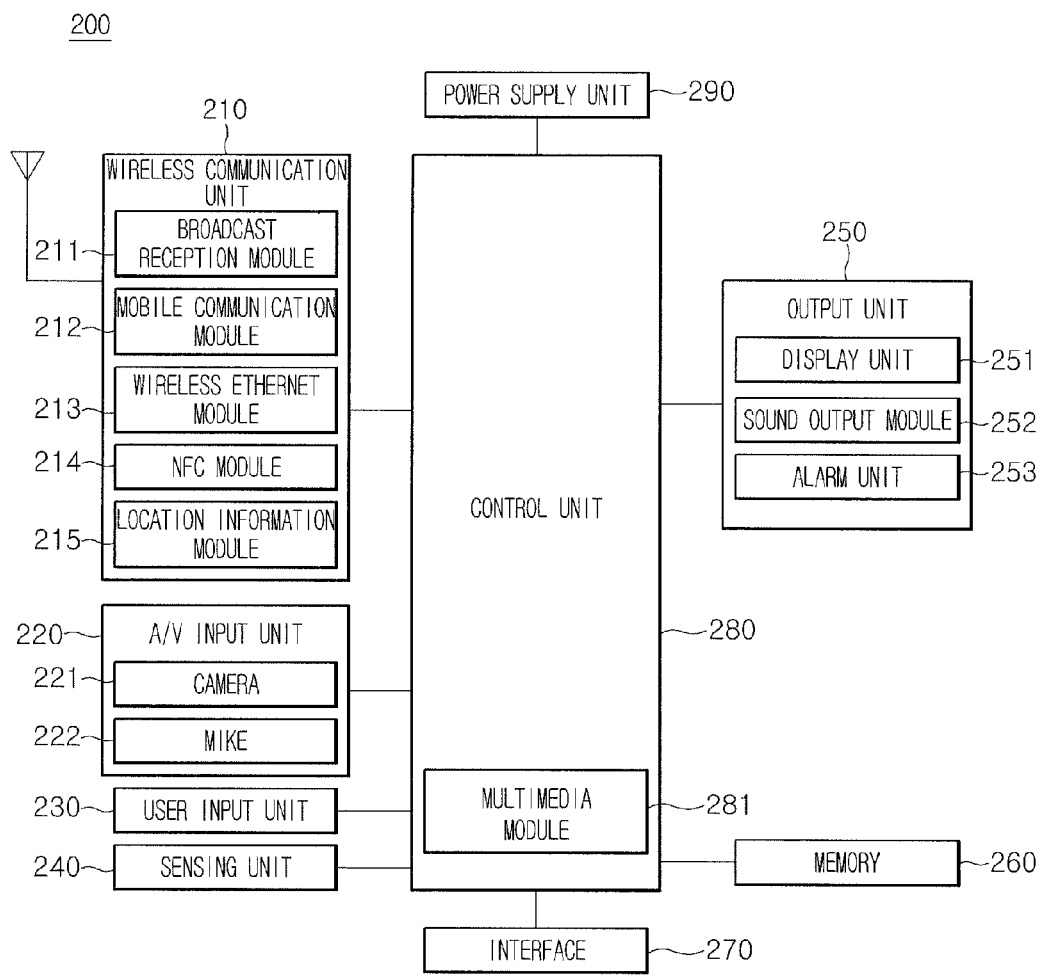
FIG. 3 is a block diagram illustrating a configuration of a mobile terminal according to an embodiment.

FIG. 3 is a block diagram illustrating a configuration of a mobile terminal according to an embodiment. The mobile terminal 200 may include a wireless communication unit 210, an A/V input unit 220, a user input unit 230, a sensing unit 240, an output unit 250, a memory 260, an interface 270, a control unit 280, and a power supply unit 290.

Referring to FIG. 3, the wireless communication unit 210 may an element for wireless communication between the mobile terminal 200 and a wireless communication system, or for wireless communication between the mobile terminal 200 and a network at which the mobile terminal 200 is located.

The wireless communication unit 210 may include a broadcast reception module 211, a mobile communication module 212, a wireless Ethernet module 213, a Near Field Communication (NFC) module 214, and a location information module 215.

According to an embodiment, the wireless communication unit 210 may transmit/receive data to/from an external device in one of various wireless communication schemes that have been described above with reference to FIG. 1.

For example, the wireless communication unit 210 may establish wireless network connection with the display device 100 according to a communication standard such as WiFi or Bluetooth, and transmit/receive content data and information for data communication to/from the display device 100 over the connected network.

The broadcast reception module 211 receives a broadcast signal and/or broadcast-related information from an external broadcast management server through a broadcast channel. The broadcast channel may include a satellite channel and a terrestrial broadcast channel.

The mobile communication module 211 transmits/receives a wireless signal to/from at least one of a base station, an external terminal, and a server over a mobile communication network. Herein, the wireless signal may include an audio call signal, a video call signal, or various types of data based on the transmission/reception of a text message or a multimedia message.

The wireless Ethernet module 213 denotes a module for accessing wireless Internet, and may be implemented as an internal module or an external module.

The NFC module 214 is a module for NFC, and may use Bluetooth, RFID, IrDA, UWB, or Zigbee.

Moreover, the location information module 215 is a module for checking or obtaining the location of a mobile terminal. As an example, a Global Position System (GPS) module may be used as the location information module 215. The GPS module receives location information from a plurality of satellites.

The A/V input unit 220 is for inputting an audio signal or a video signal, and may include a camera 221 or a mike 222. The camera 221 processes an image frame such as a still image or a moving image, which is obtained by an image sensor in a video call mode or a capture mode. The processed image frame may be displayed by the display unit 251.

The image frame processed by the camera 221 may be stored in the memory 160 or transmitted to the outside through the wireless communication unit 210. The camera 221 may be included as two or more according to the configuration aspect of a terminal.

The mike 222 receives an external sound signal through a microphone and processes the received sound signal into electric audio data, in a call mode or a record mode, or an audio recognition mode.

The user input unit 230 generates an input data in order for the user to control an operation of a terminal, for which the user input unit 230 may include a key pad, a dome switch, a touch screen (constant pressure/power failure), a jog wheel, and a jog switch.

The sensing unit 240 may include various sensors such as a touch sensor, a magnetometer, an accelerometer, a proximity sensor, a gyroscope sensor, an ambient light sensor, a colorimeter, and a tag, for sensing the current state of the mobile terminal 200.

For example, the sensing unit 240 may sense the touch of the display device 100 or detect a location/direction where the mobile terminal 200 is touched, by using the sensor.

The interface 270 interfaces all external devices connected to the mobile terminal 200. For example, the interface 270 may include a wired/wireless headset port, an external charger port, a wired/wireless data port, a memory card port, a port for the connection of a device including an identification module, an audio Input/Output (I/O) port, a video I/O port, and an earphone port.

Moreover, the output unit 250 is for inputting an audio signal or a video signal, and may include a display unit 251, a sound output module 252, and an alarm unit 253.

The display unit 251 displays and outputs information processed by the mobile terminal 200. For example, when the mobile terminal 200 is in the call mode, the display unit 251 displays a User Interface (UI) or a Graphic User Interface (GUI) associated with call. When the mobile terminal 200 is in the video call mode or the capture mode, the display unit 251 displays a captured or/and received image, a UI, or a GUI.

The sound output module 252 outputs audio data that is received from the wireless communication unit 210 or stored in the memory 260, in a call signal reception mode, a call mode, a record mode, an audio recognition mode, or a broadcast reception mode.

The memory 260 may store a program for the processing and control of the control unit 280, and temporarily store input/output content data (for example, a moving image file, a still image file, a music file, a document file, an application file, or the like).

The control unit 280 controls the overall operation of the mobile terminal 200. For example, the control unit 280 performs control and processing related to voice call, data communication, and video call. Moreover, the control unit 280 may include a multimedia module 281 for replaying multimedia content data. The multimedia module 281 may be included in the control unit 280, or implemented independently from the control unit 280.

The power supply unit 290 receives an external power or an internal power to supply a power necessary for an operation of each element, according to the control of the control unit 280.

FIG. 3 illustrates a mobile terminal including various elements, but the illustrated elements are not all essential elements. That is, the mobile terminal 200 may include elements more than the elements of FIG. 3, or at least one of the illustrated elements may not be applied.

According to an embodiment, in the display device 100 and the mobile terminal 200 respectively having the configurations that have been described above with reference to FIG. 3, when the mobile terminal 200 touches the display device 100, the display device 100 and the mobile terminal 200 may perform different functions of transmitting and receiving data according to a direction where the mobile terminal 200 is touched.

For example, when a user may touch any one of the front, rear and side of the mobile terminal 200 to the front screen portion of the display device 100 to request the sharing of content data with the display device 100, in which case a function of transmitting and receiving data performed between the display device 100 and the mobile terminal 200 may vary according to the orientation (for example, any one of the front, the rear and the side) of the mobile terminal 200.

Moreover, data transmitted/received between the display device 100 and the mobile terminal 200 may be processed by different schemes according to a location at which the mobile terminal 200 touches the display device 100.

Figure 4:
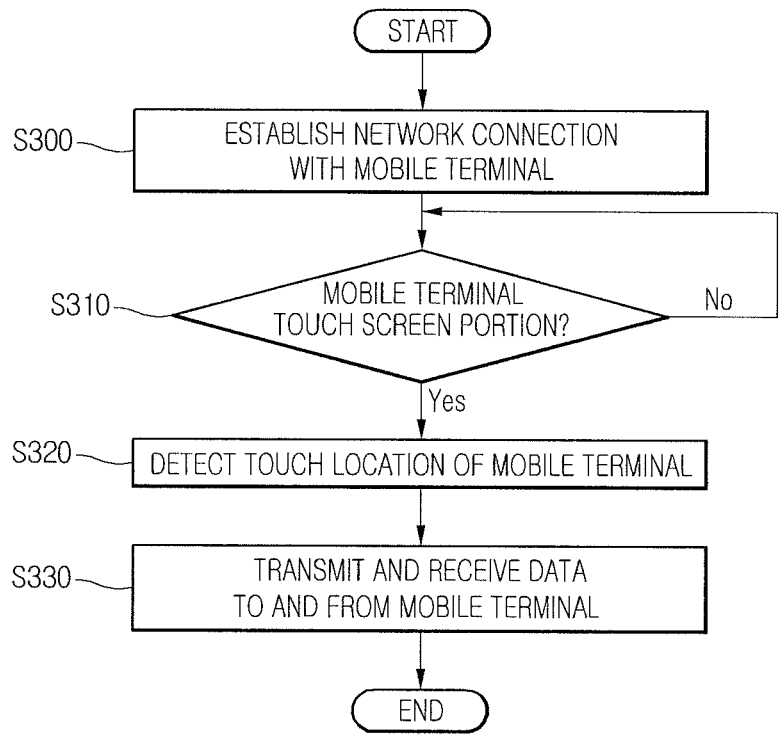
FIG. 4 is a flowchart illustrating a method of transmitting and receiving data according to an embodiment.

FIG. 4 is a flowchart illustrating a method of transmitting and receiving data according to an embodiment, and illustrates a method where the display device 100 controls the transmission/reception of data to/from the mobile terminal.

Referring to FIG. 4, the display device 100 establishes network connection with the mobile terminal 200 in operation S300.

For example, the network interface 120 of the display device 100 may transmit/receive information for network establishment to/from the mobile terminal 200 according to a corresponding communication standard, for data communication with the mobile terminal 200 using a wireless communication scheme such as WiFi, Bluetooth, UPnP/DLBNA, or UWB. The network interface 120 may establish wireless network connection on the basis of the transmitted/received network establishment information.

Network establishment information, transmitted/received between the display device 100 and the mobile terminal 200 for the network connection, may include identification (ID) information of each device, ID information regarding a corresponding network, and security information (for example, a password).

A program (for example, a content-sharing application) for executing a method of transmitting and receiving data according to an embodiment may be preinstalled in each of the display device 100 and the mobile terminal 200.

In order for the display device 100 and the mobile terminal 200 to share content data, before operation S300, an operation of registering the mobile terminal 200 in the display device 100 may be performed, and also, when the mobile terminal 200 requests network connection, an operation of authenticating the mobile terminal 200 may be further performed on the basis of the registered information.

According to an embodiment, in a state where a wireless communication function such as WiFi or Bluetooth is being activated in the display device 100 and the mobile terminal 200, if the content-sharing application installed in the mobile terminal 200 is executed, the display device 100 and the mobile terminal 200 may search each other and establish network connection.

For this, the mobile terminal 200 may store a plurality of encryption keys and a Service Set IDentifier (SSID) for WiFi network connected to the display device 100.

Network connection is established, and thereafter, when the mobile terminal 200 touches the screen portion of the display device 100 in operation S310, the display device 100 detects the orientation of the mobile terminal 200 in operation S320.

The screen portion of the display device 100 may denote a portion of the front of the display device 100 that displays an image when viewed by a user.

For example, the display unit 180 of the display device 100 may include a display panel (not shown) displaying an image, and a backlight unit (not shown) that is disposed at the rear of the display panel and supplies light to the display panel, in which case the screen portion touching the mobile terminal 200 may denote the front of the display panel.

When a functional layer such as an optical sheet or a touch panel is formed at the front of the display panel, the screen portion touching the mobile terminal 200 may denote a functional layer formed at the front of the display panel.

Moreover, the mobile terminal 200 touching the screen portion of the display device 100 denotes that the mobile terminal 200 physically touches the screen portion, and may also include a case (which is not the physical touch) where the mobile terminal 200 is very closely adjacent to the screen portion within a touch-detectable distance from the display device 100 or the mobile terminal 200.

According to an embodiment, the display unit 180 of the display device 100 may be realized as a touch screen, which may be disposed at the front of the display panel and sense the touch of an object such as a user's finger.

The touch panel determines the touch location of the object and converts the touch location into an electric signal to output the electric signal. The display device 100 may perform a function corresponding to the touch location.

The touch panel may include a plurality of touch sensors for sensing the touch and touch location of the object, and the touch sensors may sense a touch in a resistive touch scheme, a light sensing touch scheme, or a capacitive touch scheme.

For example, a capacitive touch panel may sense the change of a capacitance that is formed by a conductive sensing pattern and another ambient sensing pattern or a ground electrode when touched by a user's finger or an object, and thus converts a touch location into an electric signal.

In this case, the display device 100 may sense the touch and touch location of the mobile terminal with the touch panel included in the display unit 180.

Moreover, the sensing unit 150 of the display device 100 may detect the orientation of the mobile terminal 200 by using various sensors such as a magnetometer, an accelerometer, a proximity sensor, a gyroscope sensor, an ambient light sensor, and a colorimeter.

For example, when a user may touch any one of the front, rear and side of the mobile terminal 200 to the screen portion of the display device 100, and when touched, the sensing unit 150 may detect in which direction of the front, the rear, and the side the mobile terminal 200 is touched.

The control unit 160 of the display device 100 may determine the orientation of the mobile terminal 200 by using a sensing value outputted from the sensing unit 150. Also, the control unit 160 may use the sensing value of the sensing unit 150 and information received from the mobile terminal 200, for determining the orientation. The information received from the mobile terminal 200 may be a sensing value measured by the sensing unit 240 of the mobile terminal 200.

On the other hand, the orientation of the mobile terminal 200 may be detected by the sensing unit 240 of the mobile terminal 200 or the control unit 280, in which case information regarding the orientation of the mobile terminal 200 may be received by the display device 100 over the network that has been connected in operation S300.

Subsequently, the display device 100 transmits/receives data to/from the mobile terminal 200 according to the orientation of the mobile terminal 200 in operation S330.

For example, the function of transmitting and receiving data performed in operation S300 may vary according to the detected orientation of the mobile terminal 200, and thus, by changing the orientation of the mobile terminal 200, the user may perform control such that a desired function of transmitting and receiving data is performed between the display device 100 and the mobile terminal 200.

For example, one of predetermined first and second functions of transmitting and receiving data may be performed between the display device 100 and the mobile terminal 200 according to whether the orientation of the mobile terminal 200 is the front or the rear.

According to an embodiment, when a first surface of the mobile terminal 200 touches the screen portion of the display device 100, data may be transmitted from the mobile terminal 200 to the display device 100.

On the contrary, when a second surface of the mobile terminal 200 touches the screen portion of the display device 100, data may be transmitted from the display device 100 to the mobile terminal 200.

For example, the first surface may be the front of the mobile terminal 200, and the second surface may be the rear of the mobile terminal 200.

Hereinafter, the method of transmitting and receiving data according to an embodiment has been described above as an example when the first surface is the front of the mobile terminal 200 and the second surface is the rear of the mobile terminal, but the present invention is not limited thereto. The first surface may be the rear of the mobile terminal 200, and the second surface may be the front of the mobile terminal 200. Alternatively, one of the first and second surfaces may be the side of the mobile terminal 200.

That is, when the rear of the mobile terminal 200 touches the screen portion of the display device 100, data is transmitted from the mobile terminal 200 to the display device 100, or when the front of the mobile terminal 200 touches the screen portion of the display device 100, data is transmitted from the display device 100 to the mobile terminal 200.

When the transmission and reception of data is completed, the display device 100 processes the transmitted/received data according to the detected touch location of the mobile terminal 200 in operation S340.

For example, the control unit 160 of the display device 100 may determine whether the touch location of the mobile terminal 200 detected in operation S320 is a location of the screen of the display device 100 displaying a representation of the content data.

When the determined result shows that the front of the mobile terminal 200 touches a location of the screen of the display device 100 not displaying a representation of the content data, the control unit 160 allows content data received from the mobile terminal 200 to be displayed at the touch location.

When the front of the mobile terminal 200 touches a location displaying the representation of the content data, the control unit 160 may allow content data received from the mobile terminal 200 to be displayed at the touch location in association with representation of the content data displayed on the screen of the display device 100.

Moreover, when the rear of the mobile terminal 200 touches a location not displaying the representation of the content data, content data that is selected from among contents displayed on the screen of the display device 100 by a user may be transmitted to the mobile terminal 200, and the transmitted content data may be continuously stored in the display device 100.

When the rear of the mobile terminal 200 touches a location displaying the representation of the content data, content data displayed at the touch location may be transmitted to the mobile terminal 200, and the content data transmitted to the mobile terminal 200 may be deleted from the storage unit 170.

Hereinafter, embodiments of a method that transmits and receives data according to the orientation of the mobile terminal 200 will be described in detail with reference to FIGS. 5 to 9.

Figure 5:
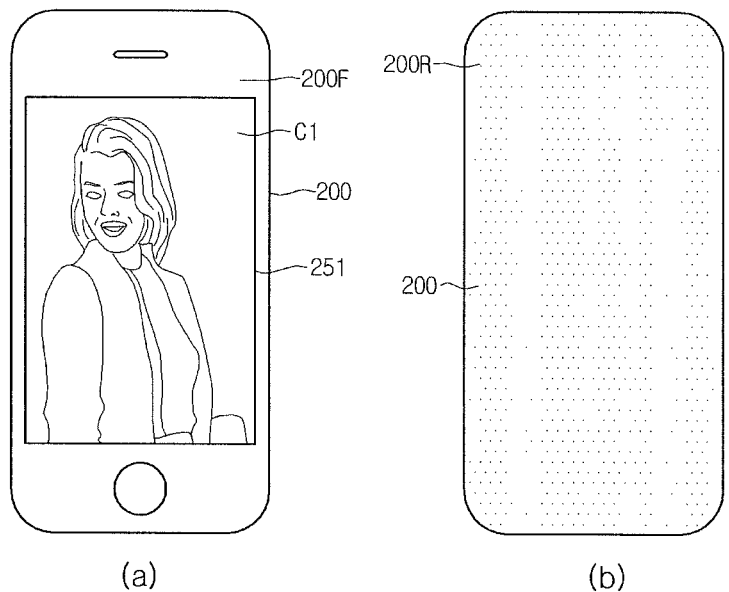
FIG. 5 is views illustrating front and rear shapes of a mobile terminal, according to an embodiment.

Referring to a portion (a) and portion (b) of FIG. 5, a display unit 251 displaying an image (for example, a photograph C1) is disposed at the front 200F of the mobile terminal 200. The rear 200R of the mobile terminal 200 may be covered by a case.

Figure 6:
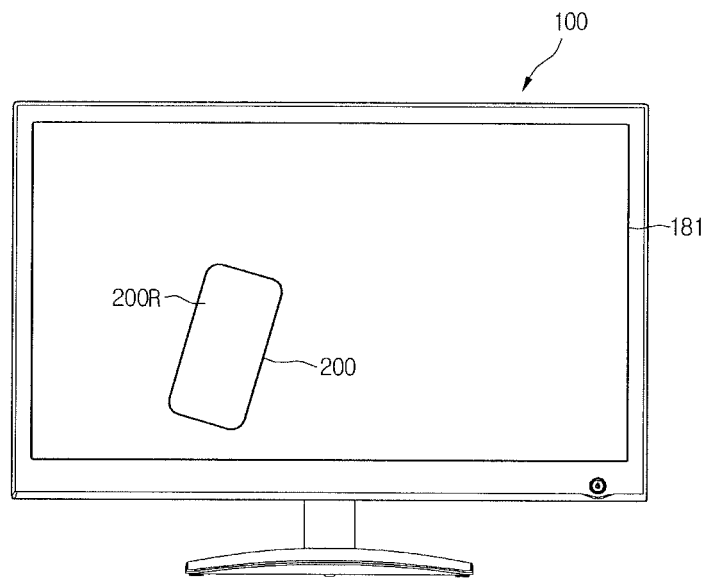
FIGS. 6 and 7 are views for describing a function of transmitting and receiving data which is performed when a mobile terminal touches a screen portion of a display device in a front direction.

Referring to FIG. 6, the user may move the mobile terminal 200 such that the front 200F of the mobile terminal 200 is oriented to the display device 100, and thus touch the front 200F of the mobile terminal 200 to the screen portion 181 of the display device 100.

In this case, data stored in the mobile terminal 200 may be transmitted to the display device 100 over the connected network, and the data transmitted to the display device 100 may include content data that is selected from the mobile terminal 200 by the user.

Figure 7:
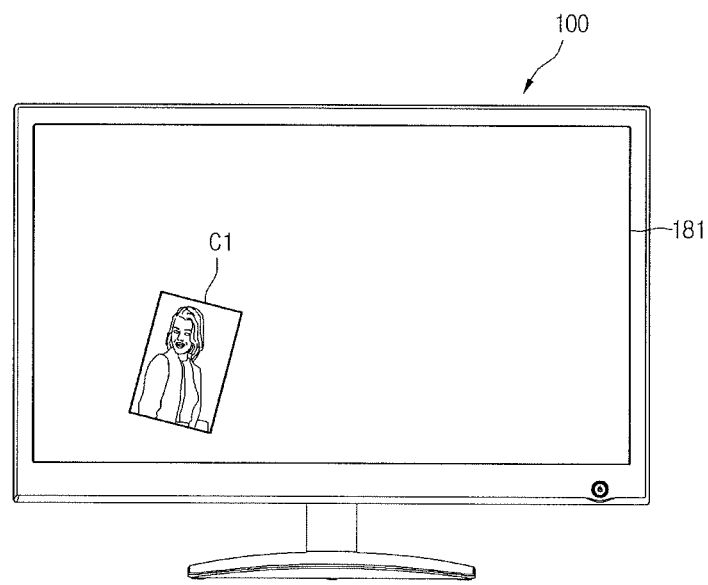

Referring to FIG. 7, in a state where the photograph C1 is being displayed by the mobile terminal 200, when the user touches the front 200F of the mobile terminal 200 to the screen portion 181 of the display device 100 and then detaches the front 200F from the screen portion 181, data including the photograph C1 may be transmitted from the mobile terminal 200 to the display device 100.

Moreover, the data of photograph C1 transmitted to the display device 100 may be outputted by the display unit 180, and the photograph C1 may be displayed in a region corresponding to the touch location of the mobile terminal 200.

Figure 8:
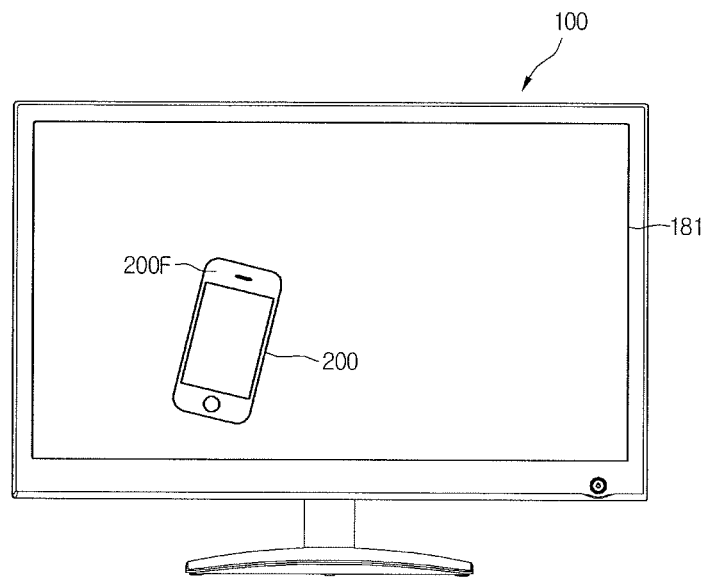
FIGS. 8 and 9 are views for describing a function of transmitting and receiving data which is performed when a mobile terminal touches a screen portion of a display device in a rear direction.

Referring to FIG. 8, the user may move the mobile terminal 200 such that the rear 200R of the mobile terminal 200 is oriented to the display device 100, and thus touch the rear 200R of the mobile terminal 200 to the screen portion 181 of the display device 100.

In this case, data stored in the mobile terminal 200 may be transmitted to the display device 100 over the connected network, and the data transmitted to the display device 100 may include content data that is selected from among contents stored in the display device 100 by the user.

Figure 9:
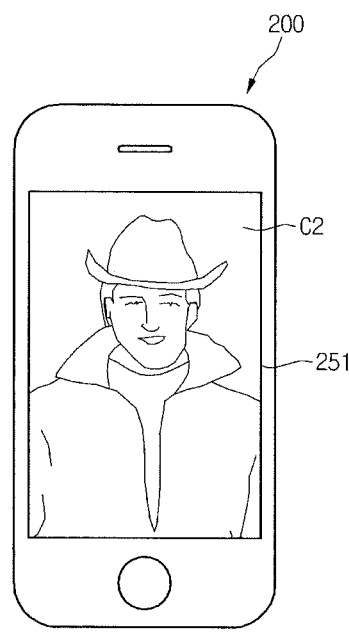

Referring to FIG. 9, when the user touches the rear 200R of the mobile terminal 200 to the screen portion 181 of the display device 100 and then detaches the rear 200R from the screen portion 181, data including a photograph C2 stored in the display device 100 may be transmitted from the display device 100 to the mobile terminal 200.

Moreover, the data of photograph C2 transmitted to the mobile terminal 200 may be outputted by the display unit 251, and the photograph C2 may be displayed on the screen of the mobile terminal 200.

In this case, data transmitted from the display device 100 to the mobile terminal 200 may include a representation of content data that is displayed at a location of the screen portion 181 of the display device 100 which is touched by the mobile terminal 200.

The method of transmitting and receiving data, according to an embodiment, has been described above with reference to FIGS. 5 to 9 as an example when the display device 100 and the mobile terminal 200 share the photograph, but the present invention is not limited thereto. The display device 100 and the mobile terminal 200 may share various contents such as a moving image, music, an application, contact information, a video streaming service, video call, a game, and news, in addition to the photograph.

Hereinafter, a method of transmitting and receiving data according to an embodiment will be described in more detail with reference to FIGS. 10 to 21.

A plurality of images may be displayed on the screen portion 181 of the display device 100, and the images may respectively represent contents stored in the display device 100.

Figure 10:
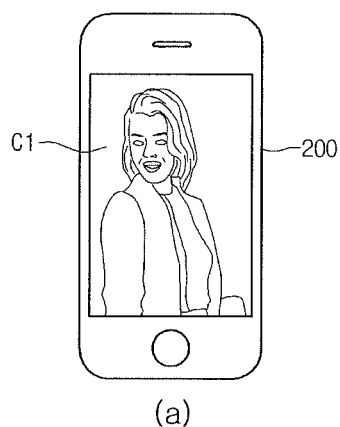
FIGS. 10 to 14 are views illustrating embodiments of a method which transmits content data stored in a mobile terminal to a display device.
Figure 10:
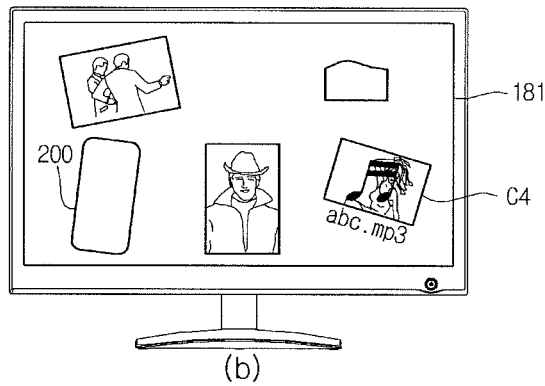
Figure 10:
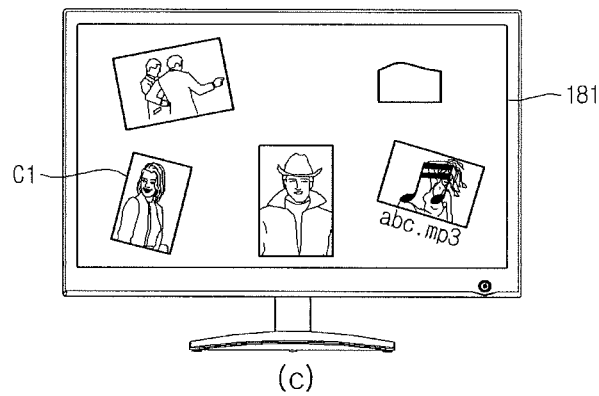

Referring to FIG. 10, when the user touches the front 200F of the mobile terminal 200, displaying the photograph C1 on its screen, to a region of the screen portion 181 of the display device 100 not displaying a representation of content data, data including the photograph C1 may be transmitted from the mobile terminal 200 to the display device 100, and thus, the photograph C1 may be displayed in a location of the screen portion 181 of the display device 100 corresponding to the touched location.

When a touch occurs by the mobile terminal 200, the photograph C1 may be displayed greater than displayed by the mobile terminal 200 in size, on the screen of the display device 100. For this, the mobile terminal 200 may enlarge the photograph C1 at a certain ratio and transmit the enlarged photograph to the display device 100.

Moreover, a state (for example, an entire photograph C1 data-to-currently transmitted data ratio) where data is transmitted from the mobile terminal 200 to the display device 100 may be displayed on the screen of the display device 100 by using a progressive bar.

As illustrated in a portion (c) of FIG. 10, when the user detaches the mobile terminal 200 from the screen portion 181 of the display device 100 to release the touch of the mobile terminal 200, the enlarged and displayed photograph C1 may be reduced and displayed in a thumbnail icon type, on the screen of the display device 100.

Subsequently, when the user selects a thumbnail icon in the photograph C1 that is displayed on the screen of the display device 100, the photograph C1 may be enlarged and displayed on an original-size screen or the entire screen.

Figure 11:
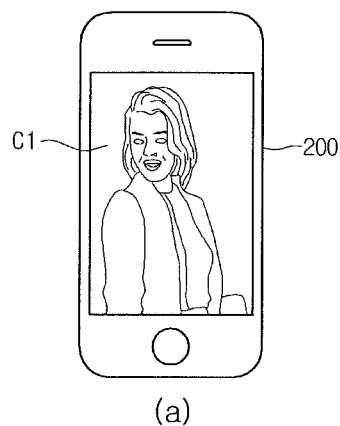
Figure 11:
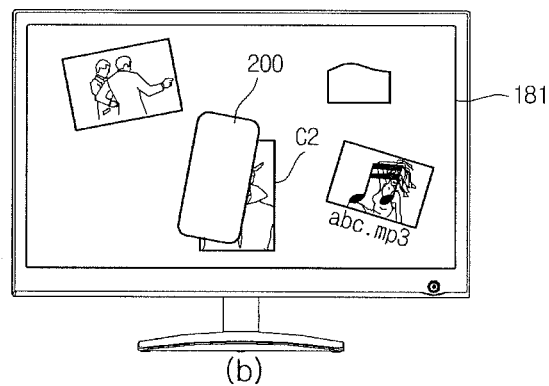
Figure 11:
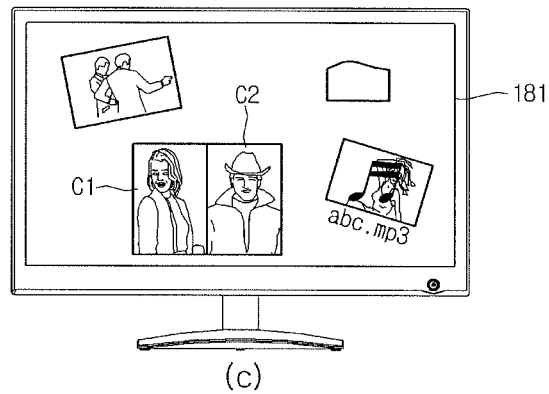

Referring to FIG. 11, when the user touches the front 200F of the mobile terminal 200, displaying the photograph C1 on its screen, to a region of the screen portion 181 of the display device 100 displaying the photograph C2, data including the photograph C1 may be transmitted from the mobile terminal 200 to the display device 100, and the photograph C1 may be displayed in combination with the displayed photograph C2 together, at the touch location.

Figure 12:
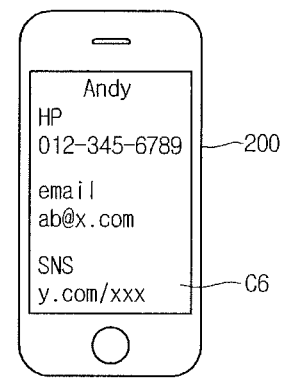
Figure 12:
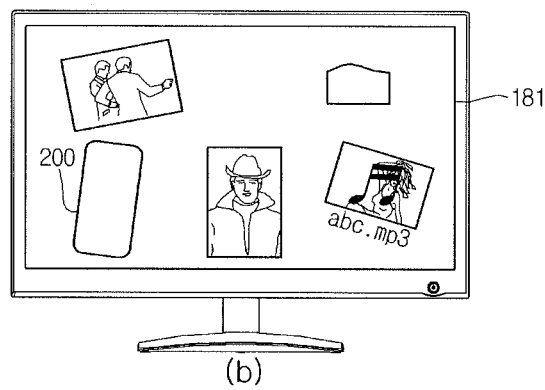
Figure 12:
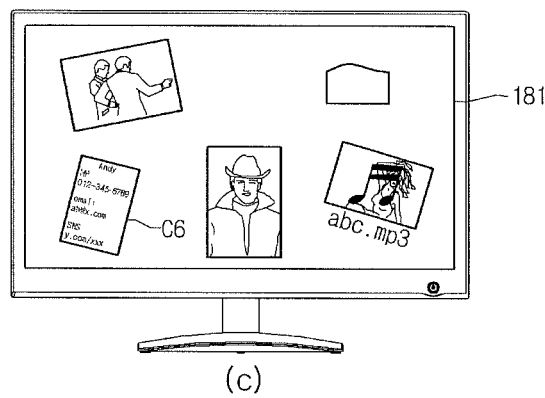

Referring to FIG. 12, when the user touches the front 200F of the mobile terminal 200, displaying contact information C6 regarding a specific person on its screen, to a region of the screen portion 181 of the display device 100 not displaying a representation of content data, data including the contact information C6 may be transmitted from the mobile terminal 200 to the display device 100, and the contact information C6 may be displayed in a region of the screen portion 181 of the display device 100 corresponding to the touch location.

Figure 13:
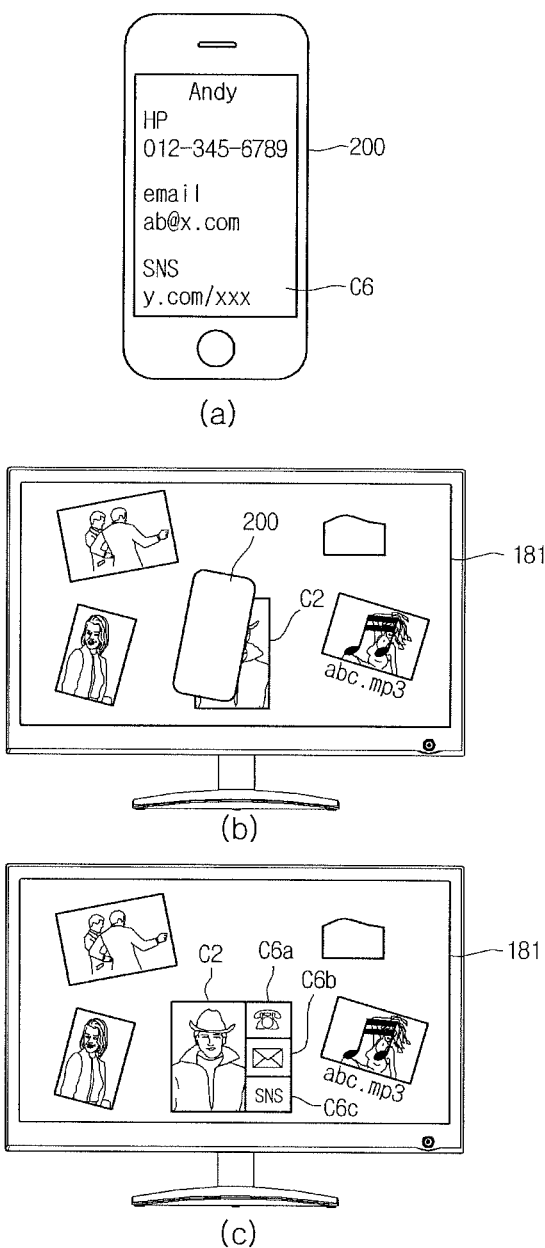

Referring to FIG. 13, when the user touches the front 200F of the mobile terminal 200, displaying the contact information C6 regarding the specific person on its screen, to a region of the screen portion 181 of the display device 100 displaying the photograph C2, contact information received from the mobile terminal 200 may be displayed in association with the photograph C2 displayed at the touch location of the mobile terminal 200.

Referring to a portion (b) of FIG. 13, when the user touches the front 200F of the mobile terminal 200 to a location of the screen portion 181 of the display device 100 displaying the photograph C2, the contact information C6 displayed by the mobile terminal 200 may be mapped to the photograph C2 stored in the display device 100.

As illustrated in a portion (c) of FIG. 13, the contact information mapped to the photograph C2 is configured as icons by items, and displayed adjacently to each other on the screen of the display device 100 together with the photograph C2.

For example, a mobile phone number in the contact information C6 displayed by the mobile terminal 200 is displayed as a first icon C6a, an email address in the contact information C6 is displayed as a second icon C6b, and a user ID of a Social Network Service (SNS) is displayed as a third icon C6c.

The user may simultaneously check the photograph and contact information of a specific person by using the icons C6a to C6c that are mapped to the photograph C2 and displayed, and select one of the icons C6a to C6c to approach a contact item corresponding to a pertinent item.

Figure 14:
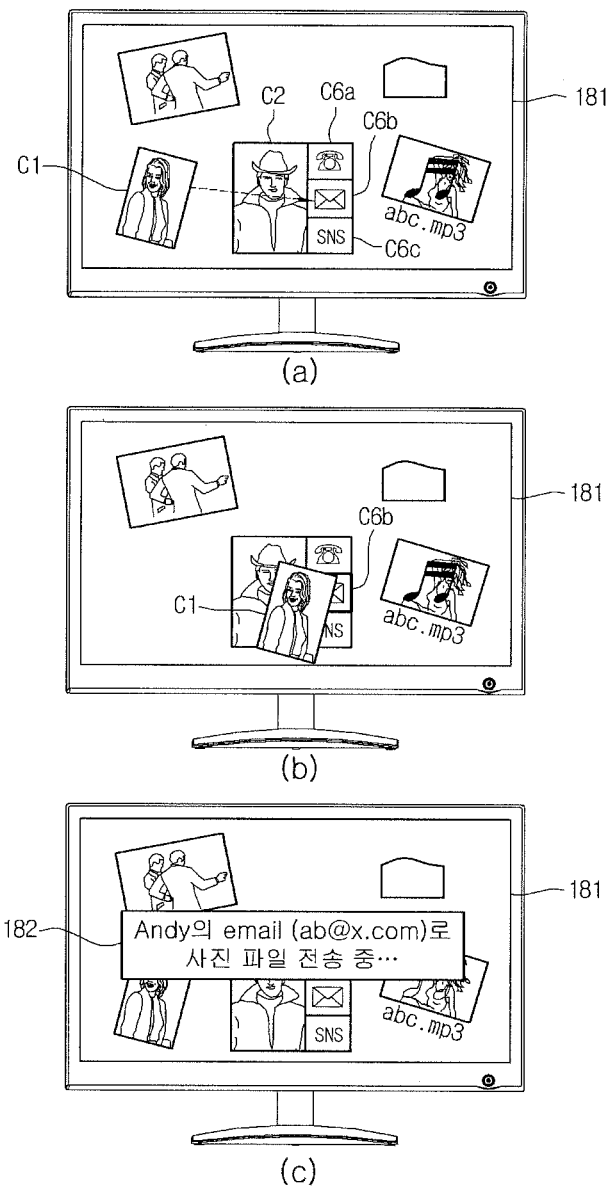

Referring to a portion (a) and portion (b) of FIG. 14, the user may drag the photograph the photograph C1 (or a thumbnail icon indicating a corresponding photograph) displayed by the display device 100 and drop the dragged photograph into a region displaying the email icon C6b mapped to the photograph C2.

In this case, as illustrated in a portion (c) of FIG. 14, data including the dragged photograph C1 may be transmitted to an email address (i.e., ab@x.com) corresponding to the email icon C6b.

A method of displaying contact information illustrated in FIG. 14 is merely an embodiment, but the present invention is not limited thereto. The contact information may be mapped to content data stored in the display device 100 and displayed in various types.

FIGS. 15 to 19 are views illustrating embodiments of a method which transmits content data stored in the display device 100 to a mobile terminal.

Figure 15:
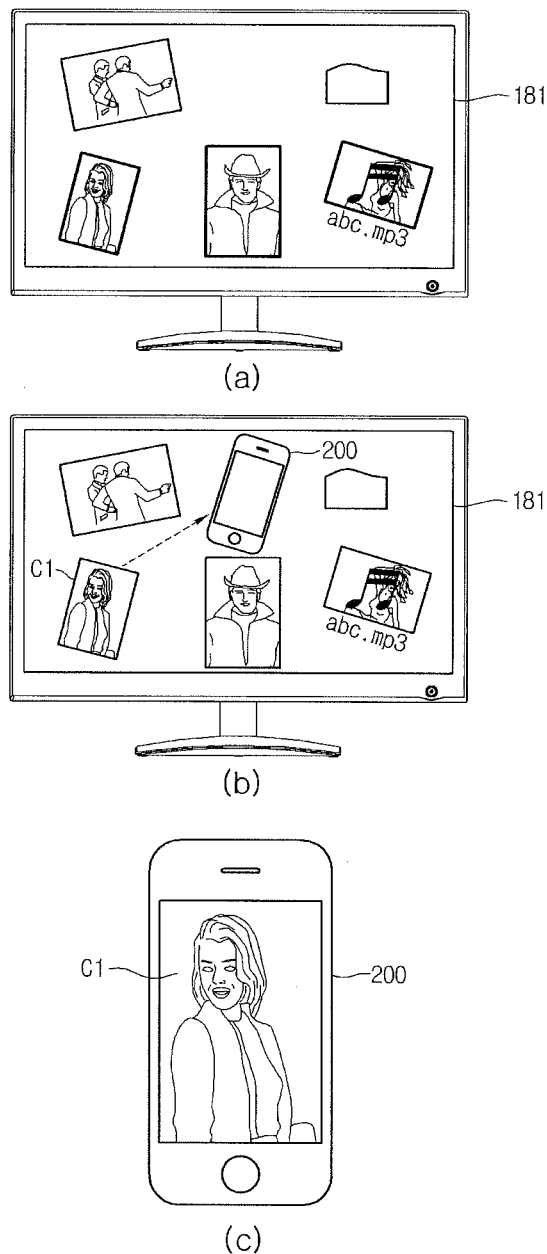
FIGS. 15 to 19 are views illustrating embodiments of a method which transmits content data stored in a display device to a mobile terminal.

Referring to a portion (a) and portion (b) of FIG. 15, when the user touches the rear 200R of the mobile terminal 200 to a region of the screen portion 181 of the display device 100 not displaying a representation of content data and then selects the photograph C1 to drag a corresponding image to a location touched by the mobile terminal 200, data of the selected photograph C1 may be transmitted to the mobile terminal 200.

When the transmission of the data of photograph C1 is completed, as illustrated in a portion (c) of FIG. 15, the mobile terminal 200 may display the photograph C1.

Figure 16:
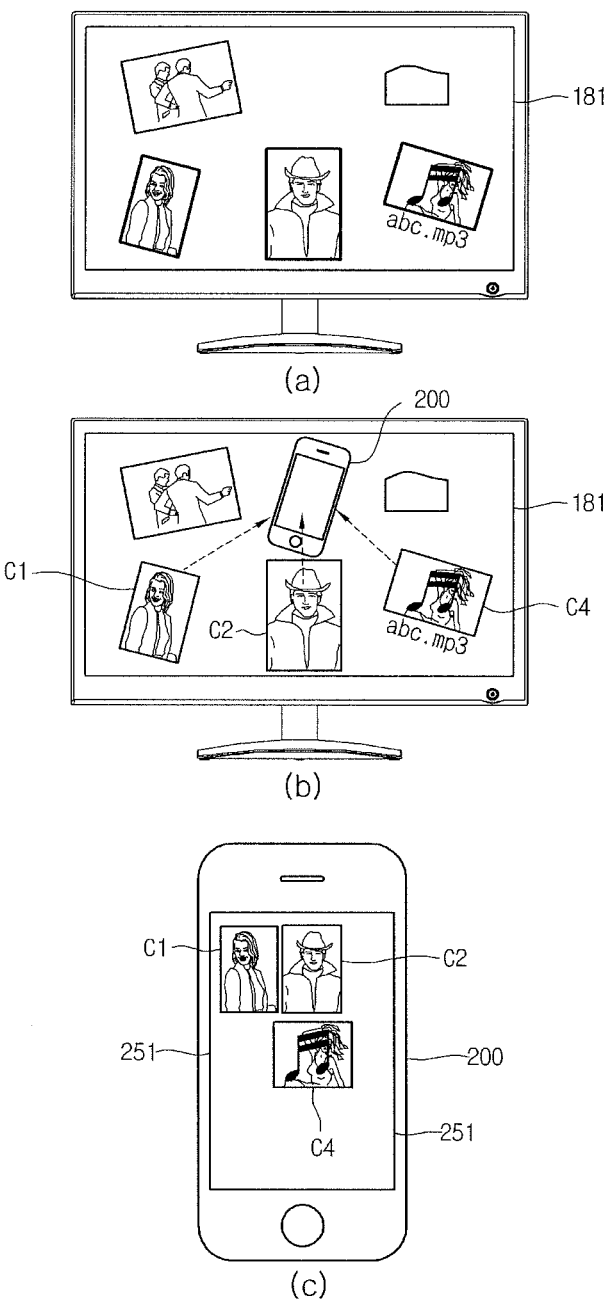

As illustrated in FIG. 16, the user may select two or more contents displayed on the screen of the display device 100, and transmit the selected contents to the mobile terminal 200.

Referring to a portion (a) and portion (b) of FIG. 16, when the user touches the rear 200R of the mobile terminal 200 to a region of the screen portion 181 of the display device 100 not displaying a representation of content data and then selects the photographs C1 and C2 and music C4 displayed on the screen of the display device 100 to drag corresponding images to a location touched by the mobile terminal 200 with three fingers, data of the selected photographs C1 and C2 and music C4 may be transmitted to the mobile terminal 200.

Figure 17:

As illustrated in FIG. 17, when the user touches the rear 200R of the mobile terminal 200 to a region of the screen portion 181 of the display device 100 not displaying the representation of content data and transmits content data stored in the display device 100 to the mobile terminal 200, similarly with a command for copying a file, the content data transmitted to the mobile terminal 200 may be continuously stored without being deleted from the storage unit 170 of the display device 100.

In this case, even an image for the transmitted content data may be continuously displayed on the screen of the display device 100, and an image dragged to the touch location of the mobile terminal 200 may be a virtual image for a corresponding content data.

For example, as illustrated in FIG. 15, even when the photograph C stored in the display device 100 is transmitted to the mobile terminal 200, the photograph C1 may not be deleted from the display device 100, and an image corresponding to the photograph C1 may be continuously displayed on the screen of the display device 100.

Figure 18:
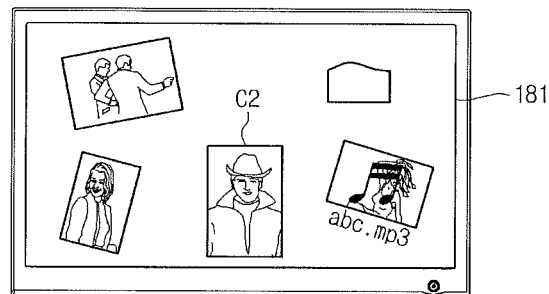
Figure 18:
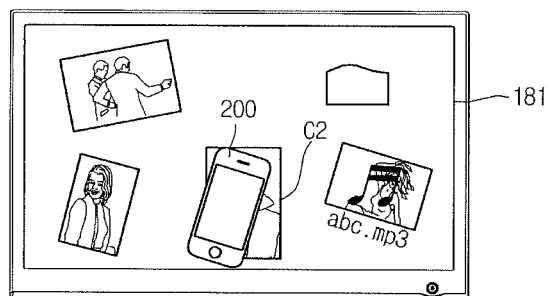
Figure 18:
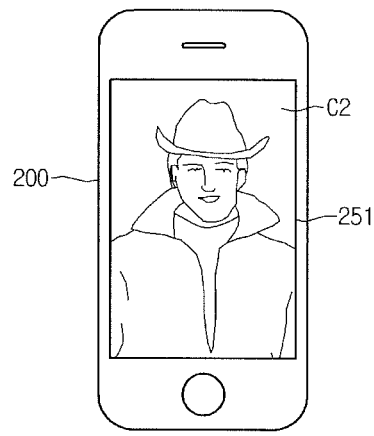

Referring to FIG. 18, the user may select one or more contents, intended to be transmitted to the mobile terminal 200, from among contents stored in the display device 100, and thereafter touch the rear 200R of the mobile terminal 200 to a region of the screen portion 181 of the display device 100 displaying the representation of content data, thereby allowing the selected content data to be transmitted from the display device 100 to the mobile terminal 200.

According to an embodiment, the display device 100 may detect a location touched by the rear 200R of the mobile terminal 200 and then transmit data, including content data displayed at the detected touch location, to the mobile terminal 200.

Referring to a portion (b) and (c) of FIG. 18, when the user touches the rear 200R of the mobile terminal 200 to a region displaying the photograph C2 among images displayed on the screen of the display device 100, data including the photograph C2 may be transmitted from the display device 100 to the mobile terminal 200, and the photograph C2 may be displayed on the screen of the mobile terminal 200.

In this case, similarly with a command for moving a file, the photograph C2 displayed at the touch location of the mobile terminal 200 may be transmitted to the mobile terminal 200 and simultaneously deleted from the storage unit 170 of the display device 100.

Figure 19:
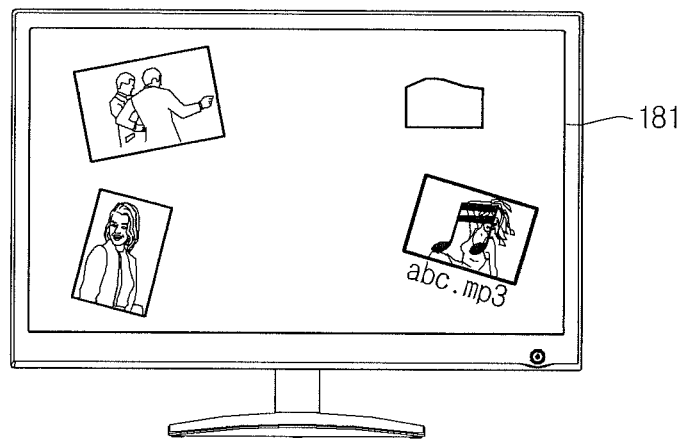

Moreover, as illustrated in FIG. 19, the photograph C2 transmitted to the mobile terminal 200 is no longer displayed on the screen of the display device 100.

According to an embodiment, when the side of the mobile terminal 200 touches the screen portion 181 of the display device 100, content data corresponding to the touch location of the mobile terminal 200 may be selected.

Figure 20:
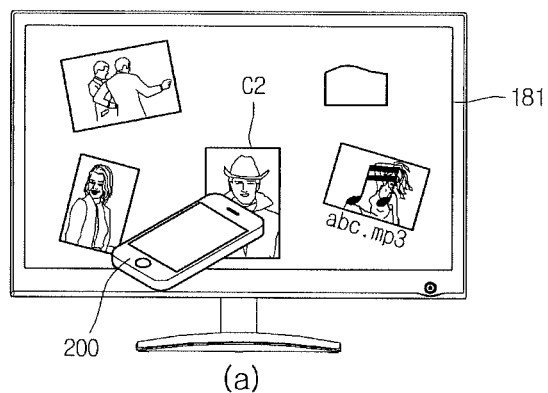
FIG. 20 is a view illustrating an embodiment of a method which selects specific content stored in a display device with a mobile terminal.
Figure 20:
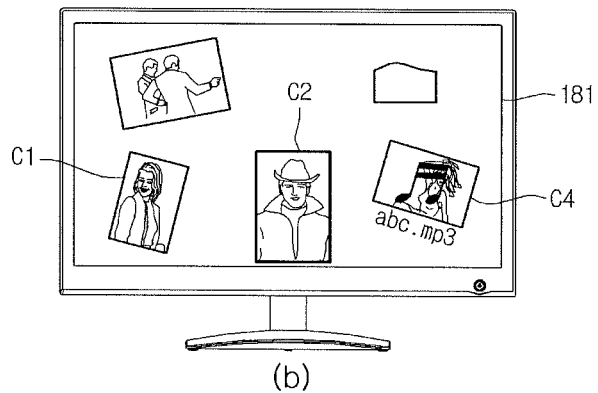
Figure 21:
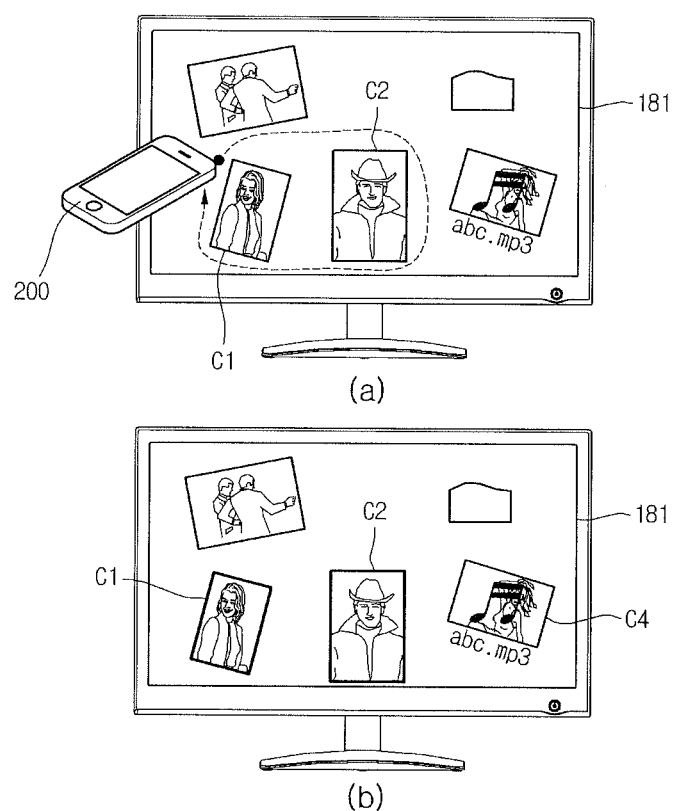
FIG. 21 is a view illustrating an embodiment of a method which selects a plurality of contents stored in a display device with a mobile terminal.

FIG. 20 illustrates an embodiment of a method which selects specific content data stored in a display device with a mobile terminal. FIG. 21 illustrates an embodiment of a method which selects a plurality of contents stored in a display device with a mobile terminal.

Referring to FIG. 20, the user may move the mobile terminal 200 to the display device 100 in an askew direction instead of the front or the rear, and touch the side of the mobile terminal 200 to the screen 181.

In this case, content data corresponding to a location touched by the side of the mobile terminal 200 may be selected from among contents displayed on the screen of the display device 100 by the user.

For example, when the user touches the side of the mobile terminal 200 to a region of the screen portion 181 of the display device 100 that displays a thumbnail icon of the photograph C2, the photograph C2 may be selected from among contents stored in the display device 100.

Referring to FIG. 21, when the user touches the side of the mobile terminal 200 to a specific point P in the screen portion 181 of the display device 100 and then moves the side of the mobile terminal 200 to form a curve in the touched state, contents (for example, the photographs C1 and C2) in the formed curve may be selected.

Hereinafter, a first embodiment of each configuration of a display device and a mobile terminal that perform the above-described method of transmitting and receiving data according to an embodiment will be described with reference to FIGS. 22 to 30.

The display device 100 according to the first embodiment may include a touch screen, and detect whether the mobile terminal 200 touches the display device 100 and a touch location with the touch screen.

According to an embodiment, before performing the method of transmitting and receiving data that has been described above with reference to FIGS. 4 to 21, a registration process and an authentication process for the mobile terminal 200 may be performed.

For example, the registration process is an operation that stores the identification information of the mobile terminal 200 in the display device 100 to authorize the sharing of content data with the display device 100. The authentication process is an operation that checks whether a corresponding device has been registered in the mobile terminal 200 that approaches the display device 100 for sharing content data.

Figure 22:
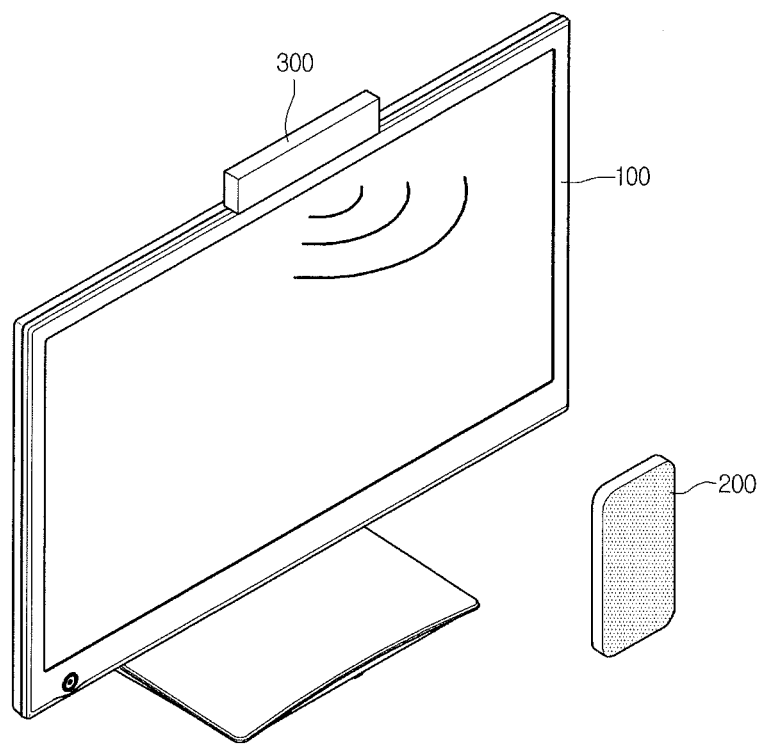
FIGS. 22 to 30 are views illustrating a first embodiment of each of a mobile terminal and a display device which perform a method of transmitting and receiving data according to an embodiment.

Referring to FIG. 22, the display device 100 includes a Frequency Modulation (FM) transmitter 300, which may transmit an FM signal including registration information over an FM frequency band.

For example, the FM transmitter 300 may scan a plurality of FM frequency bands, and transmit a Radio Data System (RDS) signal, including a password and identification information (for example, network ID) for a wireless network, over an FM frequency band in a carousel scheme.

The RDS signal may have identification information for identifying data included in the RDS payload. The RDS signal transmitted from the FM transmitter 300 may include a unique identifier, as a bit sequence (ID), for identifying the registration information.

Moreover, the network identification information (for example, the network ID) and password included in the RDS signal is encrypted, and the mobile terminal 200 may store a plurality of keys for decrypting the encrypted network identification information (for example, the network ID) and password. The encryption keys may be changed for security with the elapse of time, and the changed encryption key may be pre-provided to the display device 100 and the mobile terminal 200.

When the mobile terminal 200 executes an application for sharing content data with the display device 100, identification information (ID) for the mobile terminal 200 may be given, and the mobile terminal 200 may scan an FS spectrum.

In an operation of scanning the FM spectrum, the mobile terminal 200 may check a unique ID bit sequence included in the RDS payload to detect the RDS signal transmitted from the display device 100.

Subsequently, the mobile terminal 200 extracts the encrypted network ID and password from the detected RDS signal, and decrypt the encrypted network ID and password with a priori key.

The mobile terminal 200 may establish wireless network connection with the display device 100 by using the decrypted network ID and password.

The mobile terminal 200 may transmit the identification information (ID) of the mobile terminal 200 and user information (for example, a user name, a photograph, etc.) to the display device 100 over the connected network.

The display device 100 may store the identification information (ID) of the mobile terminal 200 received from the mobile terminal 200 to register a corresponding terminal.

In an operation of scanning the FM spectrum, when the RDS signal transmitted from the display device 100 is not detected, by displaying the message "unable to connect network for sharing content data with the display device 100", the mobile terminal 200 may provide the message.

According to an embodiment, a wireless network for connecting the display device 100 and the mobile terminal 200 may be based on a WiFi wireless communication standard, and thus, registration information transmitted using an RDS signal may include an ID and password of a WiFi network.

Figure 23:
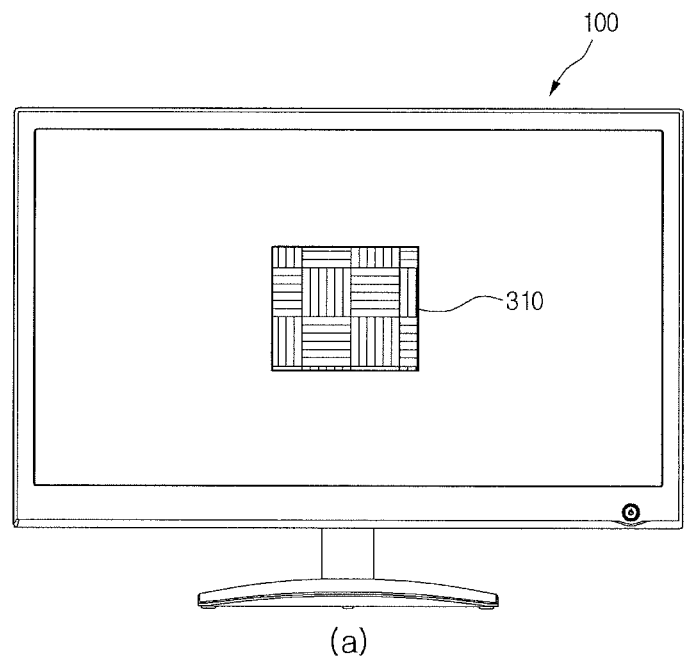
Figure 23:
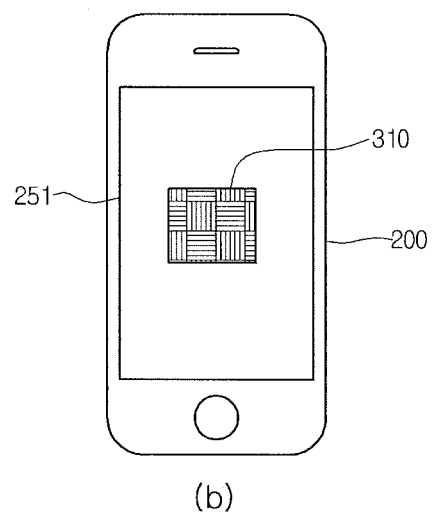

Referring to FIG. 23, the above-described registration information may be transferred from the display device 100 to the mobile terminal 200 through a pattern 310 using a steganography mechanism.

First, when the display device 100 executes an application for sharing content data and the mobile terminal 200 executes an application for sharing content data, the display device 100 may display the pattern 310 including encrypted information for network establishment.

In this case, the user may focus a camera (not shown), included in the mobile terminal 200, on the pattern 310 to allow the pattern 310 to be displayed on a screen 251 of the mobile terminal 200.

The mobile terminal 200 may collect information (for example, a WiFi network ID and a password) for network establishment from an image of the acquired pattern 310, and establish wireless network connection with the display device 100 on the basis of the collected information.

The mobile terminal 200 may transmit its identification information (for example, a model number or International Mobile Equipment Identity (IMEI) serial) to the display device 100 over the connected wireless network, and the transmitted identification information of the mobile terminal 200 may be stored and registered in the display device 100.

As described above, the registration process and authentication process for the mobile terminal 200 are performed, and thereafter, when the mobile terminal 200 touches the screen portion 181 of the display device 100, as described above with reference to FIGS. 4 to 21, different functions of transmitting and receiving data may be performed between the display device 100 and the mobile terminal 200 according to the orientation of the mobile terminal 200.

Hereinafter, embodiments of a method of detecting the orientation of the mobile terminal 200 will be described in detail with reference to FIGS. 24 to 30.

Figure 24:
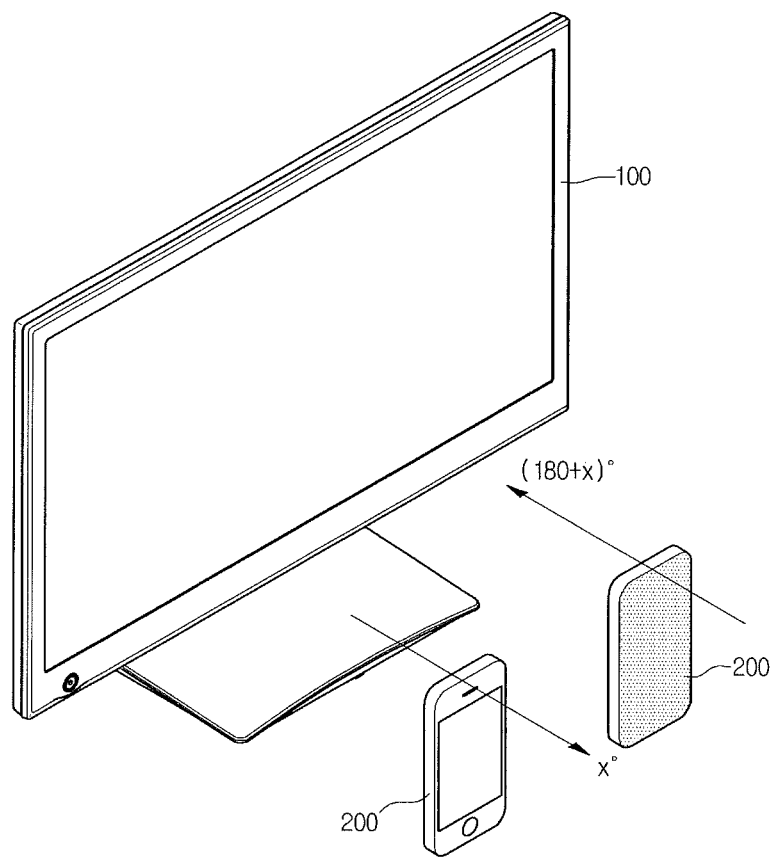

Referring to FIG. 24, the mobile terminal 200 may include a magnetometer. The mobile terminal 200 may detect the orientation with the magnetometer and transmit information regarding the orientation to the display device 100.

For example, as illustrated in FIG. 24, the mobile terminal 200 may determine the orientation as the front when an output value of the magnetometer indicates 108 degrees or more, and transmit information indicating "the orientation is the front" to the display device 100.

In this case, in touching the mobile terminal 200, the display device 100 may request the transmission of content data to the mobile terminal 200 on the basis of the received information regarding the orientation, and receive content data selected by the mobile terminal 200.

The mobile terminal 200 may determine the orientation as the rear when the output value of the magnetometer indicates less than 108 degrees, and transmit information indicating "the orientation is the rear" to the display device 100.

In this case, in touching the mobile terminal 200, the display device 100 may transmit content data to the mobile terminal 200 on the basis of the received information regarding the orientation.

Moreover, as shown in Table 1 below, the detected orientation of the mobile terminal 200 and the identification information (ID) of the mobile terminal 200 may be stored and managed in the display device 100.

TABLE 1

| ID | Orientation |
|---|---|
| 10 | Front |
| 21 | Rear |
| 51 | Front |

Figure 25:
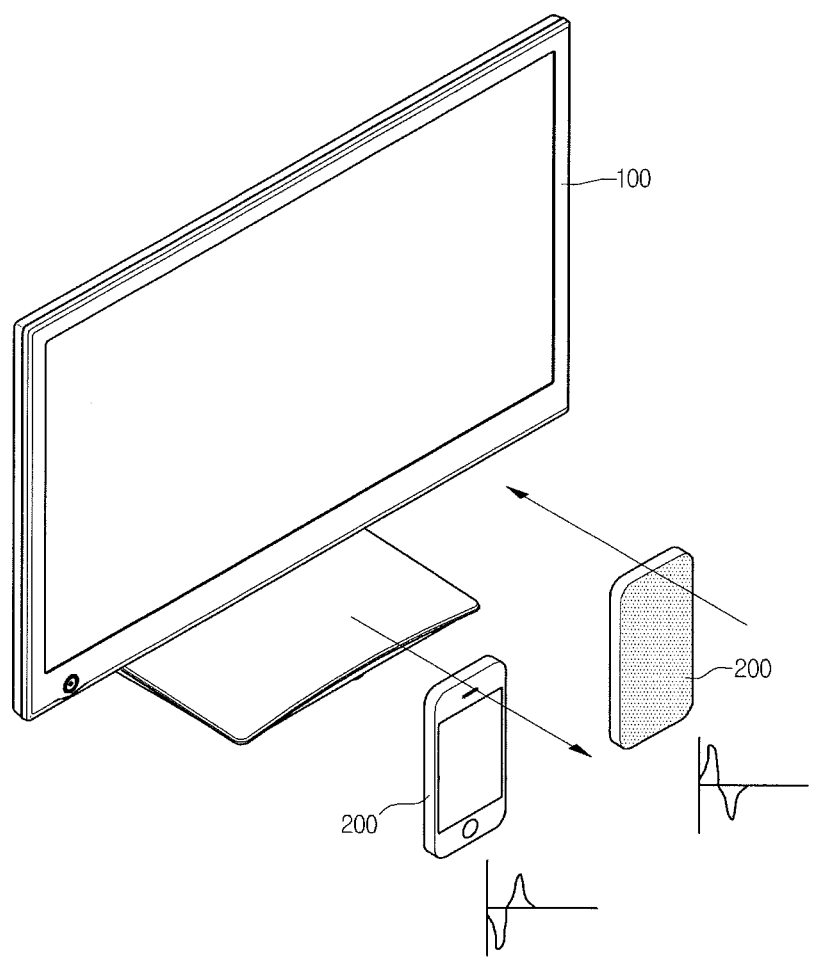

Referring to FIG. 25, the mobile terminal 200 may include an accelerometer. The mobile terminal 200 may detect the orientation by using an output value of the accelerometer.

For example, as illustrated in FIG. 25, a value that the accelerometer measures along an moving axis of the mobile terminal 200 when the orientation is the front is opposite to a value that the accelerometer measures along the moving axis of the mobile terminal 200 when the orientation is the rear, and thus, the mobile terminal 200 may detect the orientation by using the output value of the accelerometer.

Figure 26:
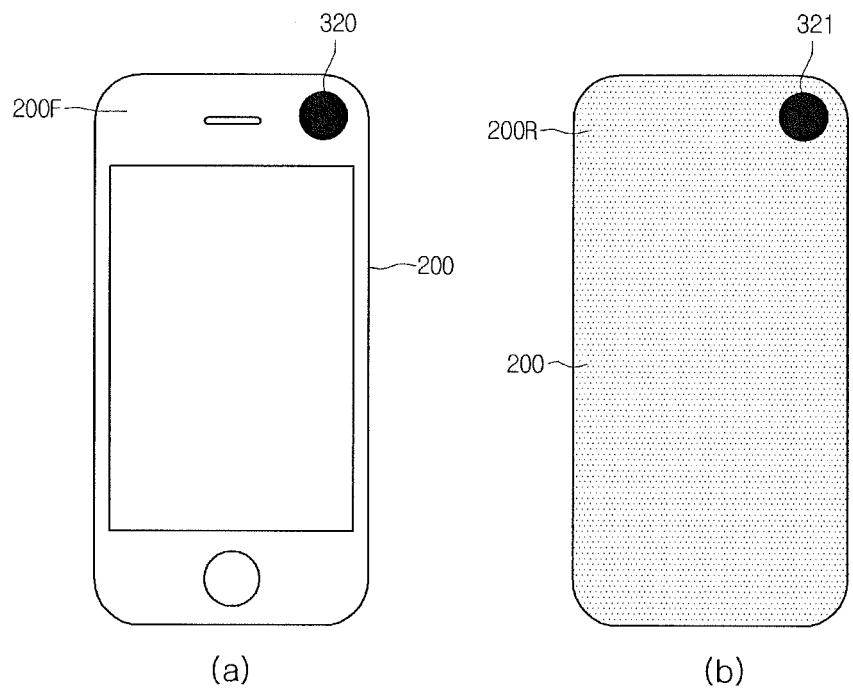

Referring to FIG. 26, the mobile terminal 200 may detect an orientation toward the display device 100 by using proximity sensors 320 and 321 respectively disposed in the front 200F and the rear 200R.

For example, when the front 200F of the mobile terminal 200 touches the screen portion 181 of the display device 100, the proximity sensor 320 disposed in the front 200F of the mobile terminal 200 may sense the approach of an object, and when the rear 200R of the mobile terminal 200 touches the screen portion 181 of the display device 100, the proximity sensor 321 disposed in the rear 200R of the mobile terminal 200 may sense the approach of an object.

Figure 27:
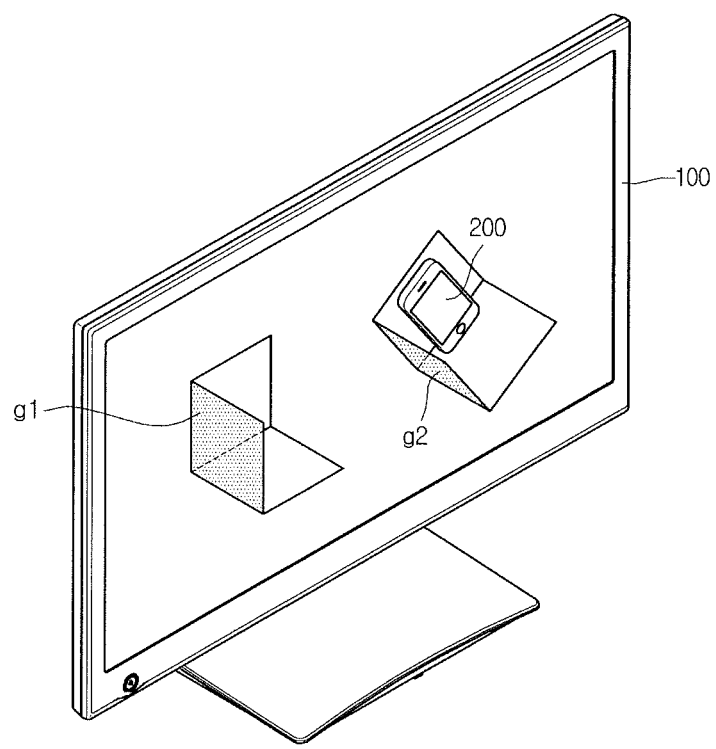

Referring to FIG. 27, the mobile terminal 200 may detect an orientation toward the display device 100 by using a gyroscope sensor.

Each of the display device 100 and the mobile terminal 200 includes a gyroscope sensor. The display device 100 may receive a specific value of the gyroscope sensor, included in the mobile terminal 200, from the mobile terminal 200 and compare the received value with a measurement value of the internal gyroscope sensor to detect the orientation of the mobile terminal 200.

That is, the display device 100 may compare an xyz axis (g1), indicating the direction of the display device 100 detected by the internal gyroscope sensor, and an xyz axis (g2), indicating the direction of the mobile terminal 200 detected by the gyroscope sensor of the mobile terminal 200, to detect the orientation.

For example, when a specific value of the gyroscope sensor included in the display device 100 is the same as a specific value of the gyroscope sensor included in the mobile terminal 200, the display device 100 may determine as touched by the rear of the mobile terminal 200.

When a difference between the xyz axis (g1) indicating the direction of the display device 100 and the xyz axis (g2) indicating the direction of the mobile terminal 200 is about 180 degrees on any one axis, the display device 100 may determine as touched by the front of the mobile terminal 200.

Moreover, when the xyz axis (g1) indicating the direction of the display device 100 differs from the xyz axis (g2) indicating the direction of the mobile terminal 200, the display device 100 may determine as touched by the side of the mobile terminal 200.

Figure 28:
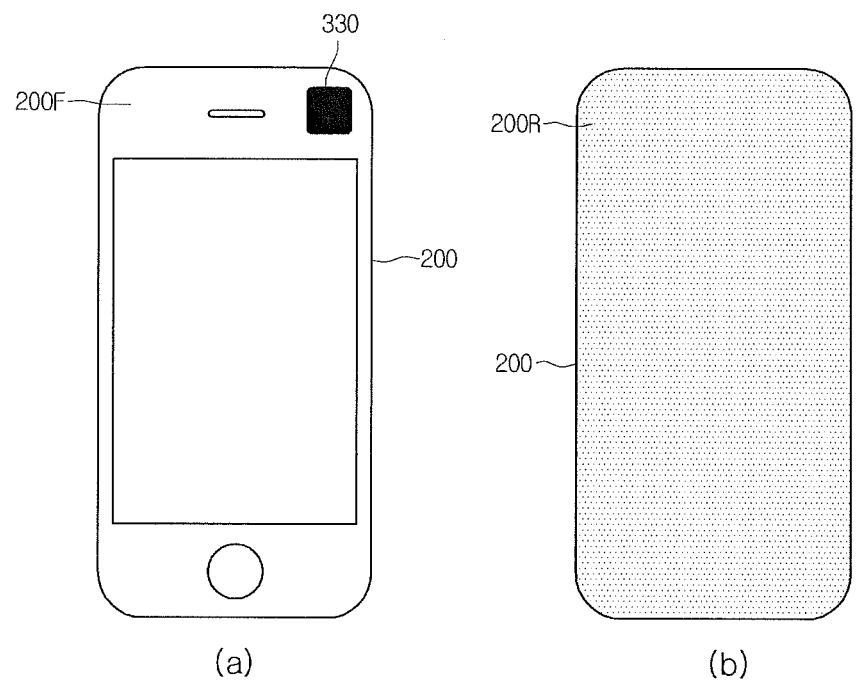

Referring to FIG. 28, the mobile terminal 200 may sense an orientation toward the display device 100 by using a light sensor 330, which may be implemented with an ambient light sensor or a colorimeter.

For example, the mobile terminal 200 may transmit color information, which has been measured by the light sensor 330 disposed in the front 200F, and the identification information (ID) of the mobile terminal 200 to the display device 100. The display device 100 may compare color information of an image, displayed at a time when the mobile terminal 200 touches the display device 100, and the color information received from the mobile terminal 200 to determine the orientation.

Figure 29:
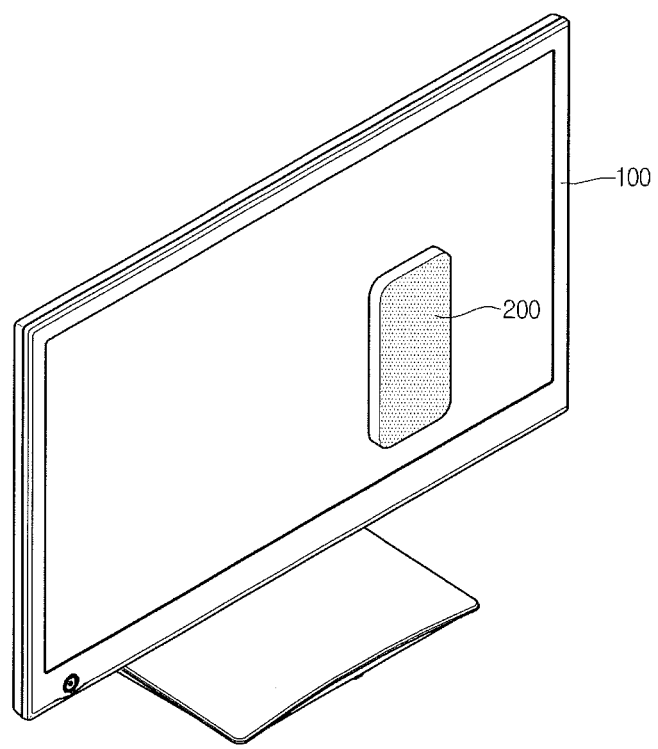

Referring to FIG. 29, when the front 200F of the mobile terminal 200 touches the screen of the display device 100, the light sensor 330 disposed in the front 200F of the mobile terminal 200 may sense an image displayed by the display device 100, and thus, color information measured by the light sensor 330 may match with color information of the image displayed by the display device 100.

Therefore, when brightness (for example, an average brightness of a region corresponding to a location touched by the mobile terminal 200, in a displayed image) of the image displayed by the display device 100 matches with light brightness that has been measured by the ambient light sensor disposed in the front of the mobile terminal 200, based on the touched time, the display device 100 may determine as touched by the front of the mobile terminal 200.

Moreover, when a color temperature (for example, a color temperature of a region corresponding to a location touched by the mobile terminal 200, in the displayed image) of the image displayed by the display device 100 matches with a color temperature that has been measured by the colorimeter disposed in the front of the mobile terminal 200 (or, when a difference between the color temperatures is within a predetermined error range), based on the touched time, the display device 100 may determine as touched by the front of the mobile terminal 200.

For this, the display device 100 may acquire color information of an image, displayed at the touched time, from display image data and store the acquired color information in the storage unit 170.

Figure 30:
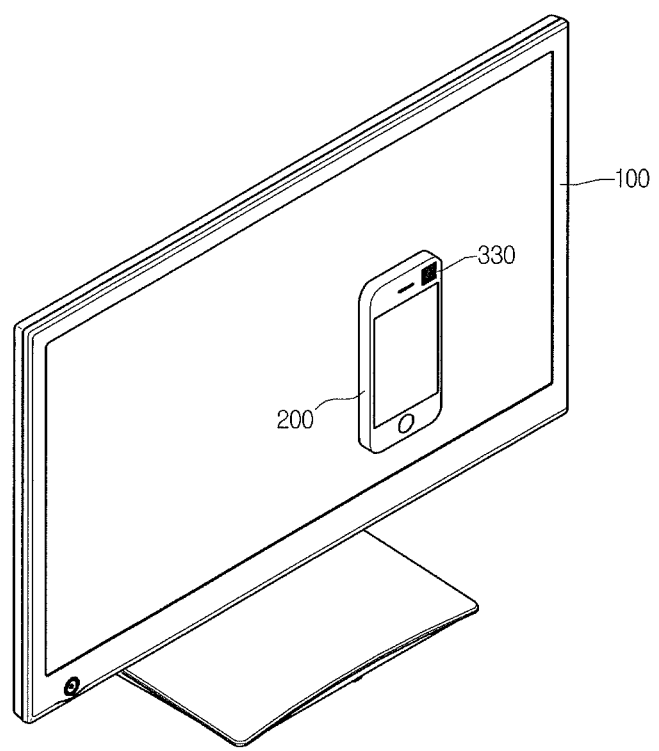

Referring to FIG. 30, when the rear 200R of the mobile terminal 200 touches the screen of the display device 100, color information measured by the light sensor 330 may differ from color information of an image displayed by the display device 100.

Therefore, when brightness (for example, an average brightness of a region corresponding to a location touched by the mobile terminal 200, in a displayed image) of the image displayed by the display device 100 differs from light brightness that has been measured by the ambient light sensor disposed in the front of the mobile terminal 200 (or, when a difference between the brightness and the light brightness lies outside a predetermined error range), based on the touched time, the display device 100 may determine as touched by the rear of the mobile terminal 200.

Moreover, when a color temperature (for example, a color temperature of a region corresponding to a location touched by the mobile terminal 200, in the displayed image) of the image displayed by the display device 100 differs from a color temperature that has been measured by the colorimeter disposed in the front of the mobile terminal 200 (or, when a difference between the color temperatures lies outside a predetermined error range), based on the touched time, the display device 100 may determine as touched by the rear of the mobile terminal 200.

According to another embodiment, one or more conductors are attached to each of the front and rear of the mobile terminal 200, and the touch of the mobile terminal 200 may be sensed with the conductors.

Moreover, the mobile terminal 200 may sense a current, flowing through the conductors in the front, to detect that the front of the mobile terminal 200 has touched the display device 100. Alternatively, the mobile terminal 200 may sense a current, flowing through the conductors in the rear, to detect that the rear of the mobile terminal 200 has touched the display device 100.

To detect the orientation, the mobile terminal 200 may include a gyroscope sensor and an accelerometer.

For example, the mobile terminal 200 may detect the orientation with a three-axis gyroscope sensor and a two-axis gyroscope sensor, and then transmit information regarding the detected orientation to the display device 100.

Hereinafter, a second embodiment of each configuration of a display device and a mobile terminal that perform the above-described method of transmitting and receiving data according to an embodiment will be described with reference to FIGS. 31 to 34.

A display device 100 according to the second embodiment may include a plurality of Near Field Communication (NFC) tags, which may be used to detect whether the mobile terminal 200 touches the display device 100 and the touch location of the mobile terminal 200.

NFC is a branch of RFID, and is a near field wireless communication scheme that has been defined as a standard in ISO 18902 for transmitting low-power data at a frequency of 13.56 MHz in a near field. Also, NFC may perform near field wireless communication at various frequency bands such as 125 KHz, 135 KHz and 900 MHz, in addition to a frequency of 13.56 MHz.

Figure 31:
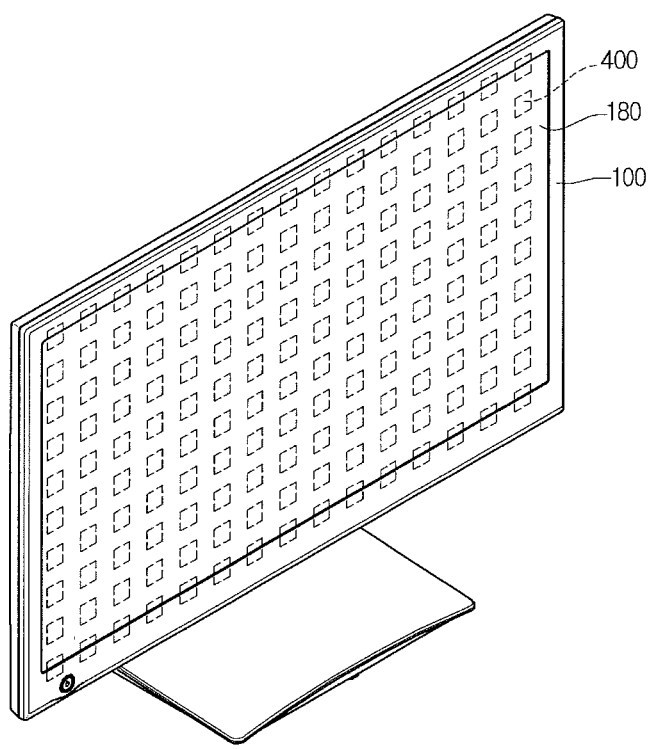
FIGS. 31 to 34 are views illustrating a second embodiment of each of a mobile terminal and a display device which perform a method of transmitting and receiving data according to an embodiment.

Referring to FIG. 31, the display device 100 may include a plurality of NFC tags 400 disposed in the rear of the display unit 180. The NFC tag 400 may be a passive NFC tag.

The NFC tag 400 may store manufacturer information regarding the display device 100, a model name, a model number, identification information (for example, a serial number) of a corresponding device, and a tag index for identifying a location at which a corresponding NFC tag is disposed. Herein, the tag index may represent the location of the NFC tag 400 as a coordinate (x, y).

That is, the serial number among the information stored in the NFC tag 400 varies per display device and is used to identify a corresponding display device 100. The tag index varies per NFC tag and is used to identify the location of a corresponding NFC tag 400.

Figure 32:
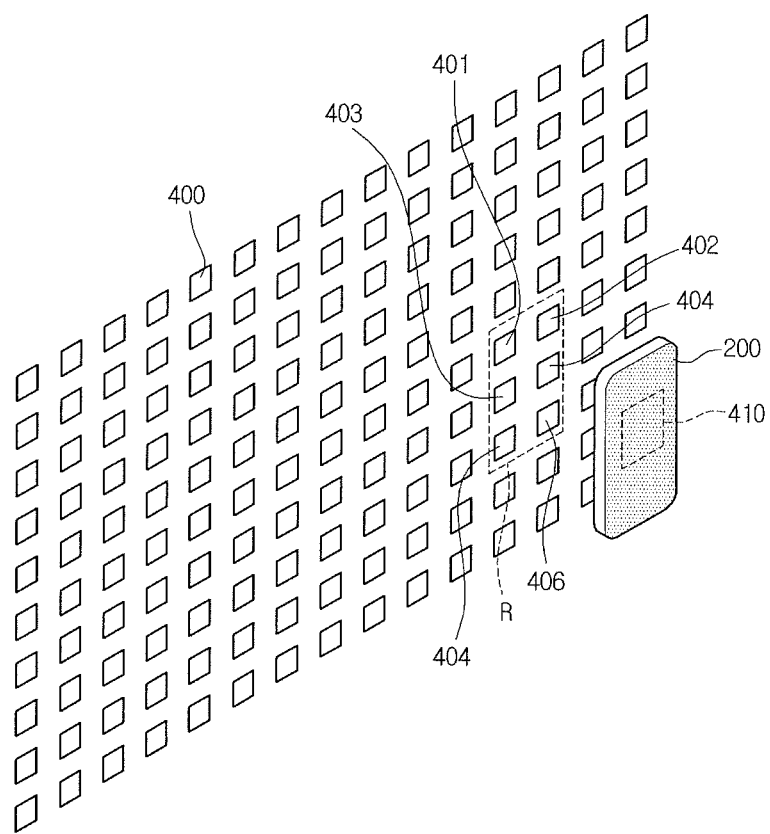

Referring to FIG. 32, the mobile terminal 200 may include an NFC reader 410. Herein, the NFC reader 410 may transmit a power and a signal to the NFC tag 400 included in the display device 100 to activate the NFC tag by using a signal of a certain frequency band (for example, a frequency band of 13.56 MHz), and may read data stored in the activated tag 400.

The NFC reader 410 included in the mobile terminal 200 may read data from an NFC tag that is located in a certain distance, for example, about 4 cm, from the mobile terminal 200.

Therefore, when the mobile terminal 200 touches the display device 100 and approaches to within 4 cm from an NFC tag disposed in the rear of the display unit 180, the NFC reader 410 included in the mobile terminal 200 may receive information stored in the NFC tag.

For example, as illustrated in FIG. 32, when the mobile terminal 200 touches the display device 100, the NFC reader 200 included in the mobile terminal 200 may read information that is stored in a plurality of NFC tags 401 to 406, disposed in a touch region R of the mobile terminal 200, among a plurality of NFC tags.

The mobile terminal 200 may check manufacturer information, a model name, a model number, and a serial number that are read with the NFC reader 410, and detect that the mobile terminal 200 has touched the display device 100.

In order to detect the touch of the mobile terminal 200 by using the NFC tag 400 included in the display device 100 and the NFC reader 410 included in the mobile terminal 200, as described above, a distance from the front of the display device 100 to the NFC tag 400 may be set to a certain distance (for example, 4 cm) within which data stored in the NFC tag 400 may be read, or a value slightly greater than the certain distance.

That is, as illustrated in FIG. 31, when the NFC tag 400 is disposed in the rear of the display unit 180, the thickness (for example, a sum of the thicknesses of the display panel and backlight unit) of the display unit 180 may have the certain distance or a value slightly greater than the certain distance.

Moreover, the mobile terminal 200 may detect the touch location with a tag index that is read with the NFC reader 410.

For example, the mobile terminal 200 touching the display device 100 may read a tad index from each of the NFC tags 401 to 406 disposed in the touch region R, and detect a location, touched by the mobile terminal 200, with coordinates (x, y) of the read tag indexes.

Data stored in the NFC tags 400 may be a plurality of UPnP device description parameters, respectively. When the mobile terminal 200 touches the display device 100, the mobile terminal 200 may detect whether the touch occurs and a touch location by using the UPnP device description parameters that are read from the NFC tag 400 with the NFC reader 410.

The UPnP device description parameters may be used to the above-described registration and authentication operations for the mobile terminal 200.

Figure 33:
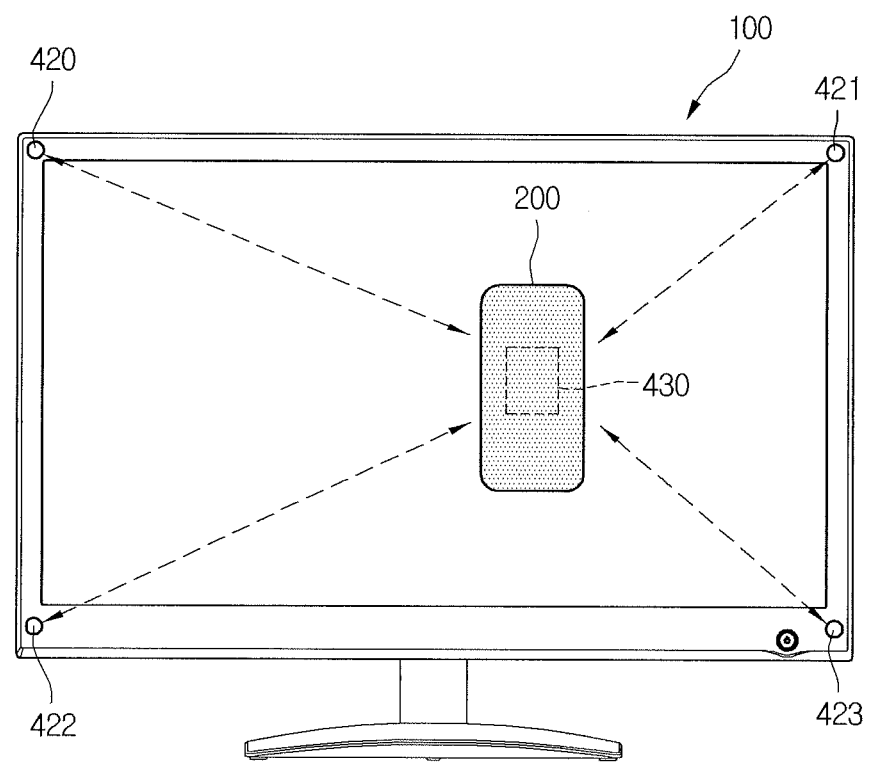

Referring to FIG. 33, the display device 100 may read data (for example, the UPnP device description parameters), stored in an RFID tag 430 of the mobile terminal 200, with a plurality of RFID readers 420 to 423 disposed at an edge portion.

The display device 100 may compare the intensities of respective RF signals received from the RFID readers 420 to 423 to detect the touch location of the mobile terminal 200.

For example, when the intensities of respective RF signals received from the RFID readers 420 to 423 are the same, the touch location of the mobile terminal 200 may be determined as the center portion of the display device 100, and as the intensity of an RF signal received from a specific RFID reader becomes greater, the touch location may be moved to be adjacent to a corresponding RFID reader.

Figure 34:
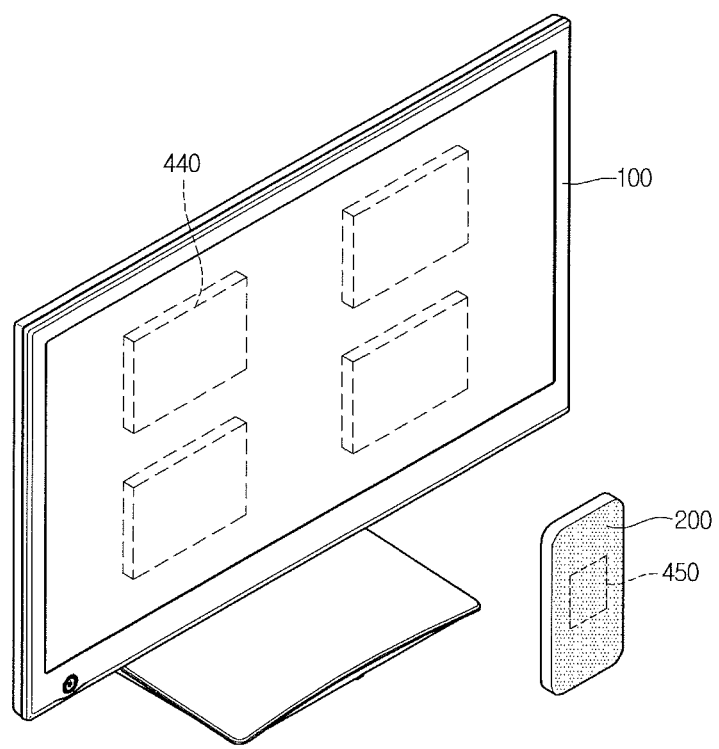

Referring to FIG. 34, an RFID reader 440 is included in the display device 100, and the RFID tag 430 is included in the mobile terminal 200. Therefore, the display device 100 and the mobile terminal 200 may perform the operations that have been described above with reference to FIGS. 31 to 33, respectively.

The display device 100 may receive a plurality of sensing values (for example, information regarding the orientation of the mobile terminal 200 or an output value of a sensor for sensing the orientation) measured by the sensing unit 240 of the mobile terminal 200, in the RFID near field wireless communication scheme that has been described above with reference to FIGS. 31 to 33.

FIGS. 35 to 41 are views illustrating a third embodiment of each of a mobile terminal and a display device which perform a method of transmitting and receiving data according to an embodiment. A touch location and orientation of the mobile terminal may be detected with a catadioptric camera included in the display device 100.

Figure 35:
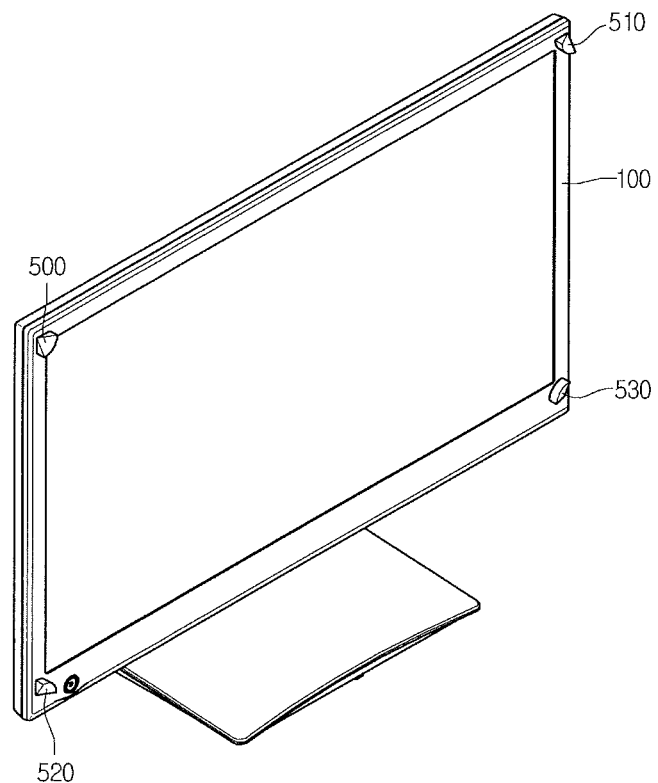
FIGS. 35 to 41 are views illustrating a third embodiment of each of a mobile terminal and a display device which perform a method of transmitting and receiving data according to an embodiment.

Referring to FIG. 35, a plurality of catadioptric cameras 500 to 530 may be installed at an edge portion of the display device 100.

Figure 36:
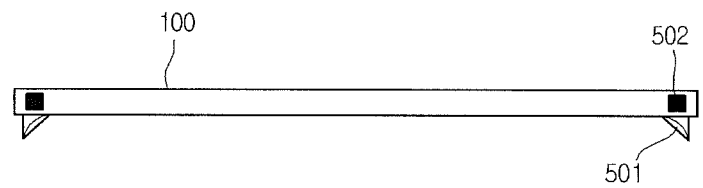

The catadioptric camera 500, as illustrated in FIG. 36, may include a catadioptric reflector 501 having a low profile, and a camera 502 having a special lens system. The catadioptric reflector 501 may be implemented with a convex mirror having a certain focus length.

Figure 37:
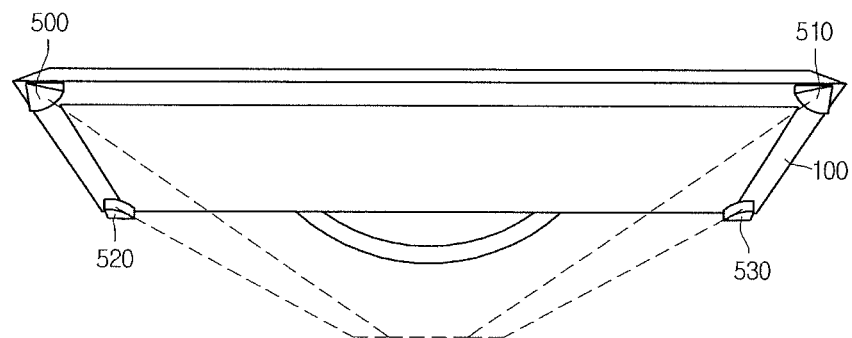

The display device 100 may acquire an image of the screen portion from four different perspectives, with the catadioptric cameras 500 to 530 having the above-described configuration, and thus may secure a field of view as illustrated in FIG. 37.

Figure 38:
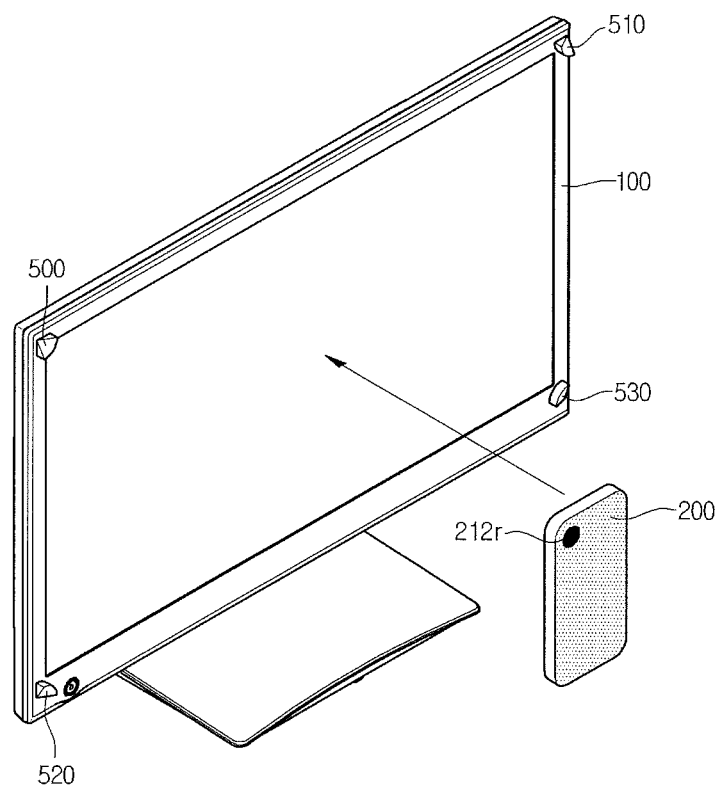

Referring to FIG. 38, when a user moves the front of the mobile terminal 200 toward the display device 100 and the mobile terminal 200 lies within a field of view of each of the catadioptric cameras 500 to 530 illustrated in FIG. 37, cameras 212f and 212r respectively disposed in the front and rear of the mobile terminal 200 may operate, and thus, the display device 100 and the mobile terminal 200 may recognize each other with the catadioptric cameras 500 to 530 and the front camera 212f.

In this case, the mobile terminal 200 may determine the orientation of the mobile terminal 200 as the front by using the image of the display device 100 that has been acquired with the front camera 212f, or the display device 100 may determine the orientation as the front by using the image (for example, a front shape of the mobile terminal 200) of the mobile terminal 200 that has been acquired with the catadioptric cameras 500 to 530.

Figure 39:
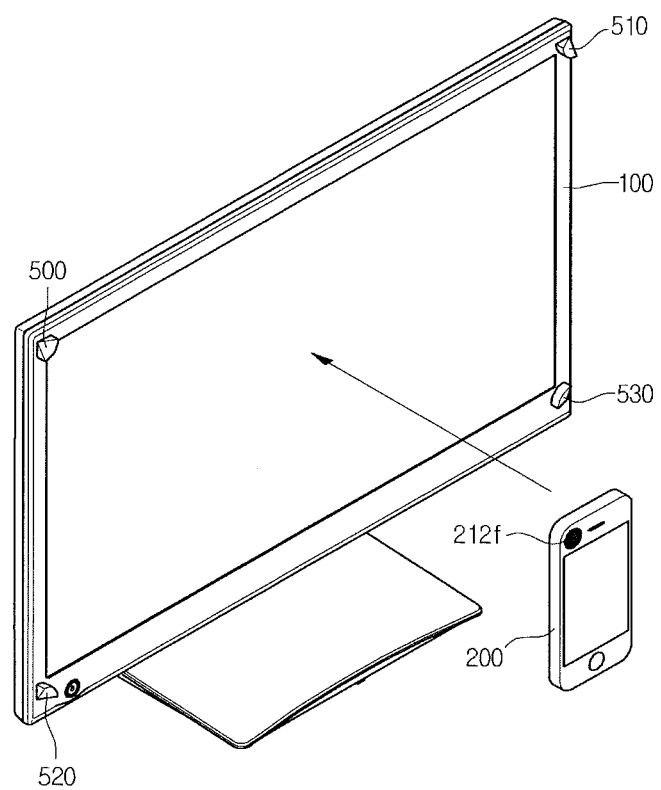

Referring to FIG. 39, when the user moves the rear of the mobile terminal 200 toward the display device 100 and the mobile terminal 200 lies within a field of view of each of the catadioptric cameras 500 to 530, the display device 100 and the mobile terminal 200 may recognize each other with the catadioptric cameras 500 to 530 and the rear camera 212r.

In this case, the mobile terminal 200 may determine the orientation of the mobile terminal 200 as the rear by using the image of the display device 100 that has been acquired with the rear camera 212r, or the display device 100 may determine the orientation as the rear by using the image (for example, a rear shape of the mobile terminal 200) of the mobile terminal 200 that has been acquired with the catadioptric cameras 500 to 530.

Figure 40:
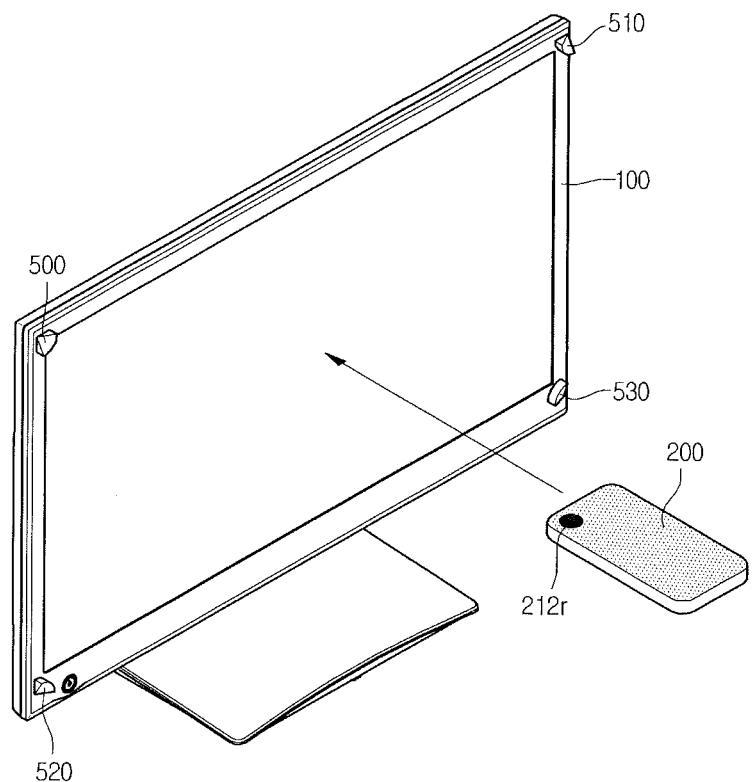

Referring to FIG. 40, when the user moves the side of the mobile terminal 200 toward the display device 100 and the mobile terminal 200 lies within a field of view of each of the catadioptric cameras 500 to 530, the display device 100 and the mobile terminal 200 may recognize each other with the catadioptric cameras 500 to 530, the front camera 212f, and the rear camera 212r.

In this case, the mobile terminal 200 may determine the orientation of the mobile terminal 200 as the side by using the image of the display device 100 that has been acquired with the front camera 212f and the rear camera 212r, or the display device 100 may determine the orientation as the side by using the image (for example, a front shape and rear shape of the mobile terminal 200) of the mobile terminal 200 that has been acquired with the catadioptric cameras 500 to 530.

Alternatively, at a time when the mobile terminal 200 lies within a field of view of each of the catadioptric cameras 500 to 530, the magnetometer, accelerometer, proximity sensor, gyroscope sensor, ambient light sensor, or colorimeter included in the mobile terminal 200 may operate, and thus, the orientation may be detected by the above-described scheme.

When the mobile terminal 200 touches the display device 100, the display device 100 may detect the orientation of the mobile terminal 200 by using an image that is acquired with the catadioptric cameras 500 to 530.

Figure 41:
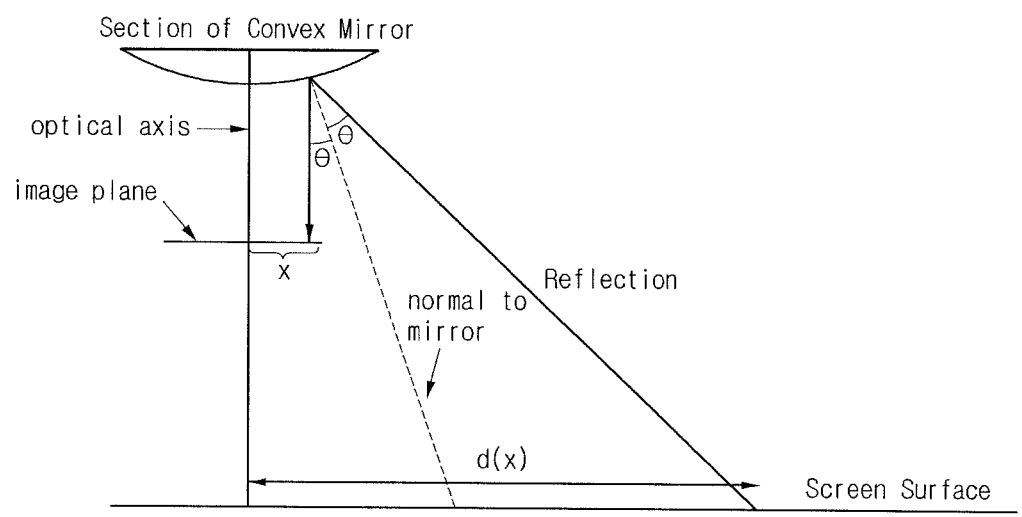

Referring to FIG. 41, a distance d(x) from the optical axis of the catadioptric camera 500 to a touch point P may be calculated with a distance 'x' on an image plane and an angle (θ) of a line vertical to the convex mirror.

As described above, when distances d(x) to the touch point P have been calculated with the four catadioptric cameras 500 to 530 respectively disposed at the edge portions of the display device 100, the display device 100 may determine the touch location of the mobile terminal 200 with the calculated distances d(x).

In the above description, embodiments of the method that detects whether the mobile terminal 200 touches the display device 100 and the touch location and orientation of the mobile terminal 200 have been described above, but are not limited thereto.

For example, the display device 100 may detect whether the mobile terminal 200 touches the display device 100 and the touch location of the mobile terminal 200 by using a plurality of light sources (for example, IR LED emitters) disposed at respective edge portions and a plurality of IR photodetectors.

The method of transmitting and receiving data according to embodiments may be manufactured as programs executable in computers and be stored in a computer readable recording medium. Examples of the computer readable recording medium include read-only memory (ROM), random-access memory (RAM), CD-ROMs, magnetic tapes, floppy disks, optical data storage devices, and carrier waves (such as data transmission through the Internet).

The computer readable recording medium can be distributed over network coupled computer systems so that the computer readable code is stored and executed in a distributed fashion. Also, functional programs, codes, and code segments for accomplishing the present invention can be easily construed by programmers skilled in the art to which the present invention pertains.

According to embodiments, in a case where data is transmitted/received between the display device and the mobile terminal, the mobile terminal differently processes transmitted/received data according to a location at which the mobile terminal touches the screen portion of the display device, and thus, provided can be an intuitive user interface that may allow a user to easily control the transmission/reception of data between the display device and the mobile terminal.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A method of facilitating communications between at least one mobile terminal and a display device, the method comprising:
    determining whether a mobile terminal and the display device that is physically distinct of the mobile terminal are locationally proximate;
    based on a determination that the mobile terminal and the display device are locationally proximate, identifying a first portion of a screen of the display device where the mobile terminal has a high locational proximity relative to at least one other portion of the screen;
    based on a determination that the mobile terminal and the display device are locationally proximate, determining a side of the mobile terminal that faces the screen of the display device, wherein the side of the mobile terminal that faces the screen of the display device is either a first side of the mobile terminal exposing a screen of the mobile terminal or a second side of the mobile terminal that is an opposite side of the first side;
    based on determining the side of the mobile terminal that faces the screen of the display device, determining a data transfer direction among at least a first data transfer direction from the display device to the mobile terminal and a second data transfer direction from the mobile terminal to the display device; and
    processing, by the display device, content data based on the determined data transfer direction,
    wherein processing, by the display device, content data based on the determined data transfer direction comprises:
        based on the determined data transfer direction being the first data transfer direction, transmitting, to the mobile terminal, a first content item which is displayed at the first portion of the display device, and
        based on the determined data transfer direction being the second data transfer direction, receiving, from the mobile terminal, a second content item.

2. The method of claim 1, further comprising:
    determining whether the first portion of the screen of the display device is displaying a representation of the first content item, and
    wherein processing, by the display device, content data based on the determined data transfer direction further comprises:
        processing the content data based on the determined data transfer direction and whether the first portion of the screen is displaying the representation of the first content item.

3. The method of claim 2, wherein receiving, from the mobile terminal, a second content item comprises:
    determining that the first portion of the screen of the display device is displaying the representation of the first content item, and
    based on determining that the first portion of the screen of the display device is displaying the representation of the first content item,
        receiving the second content item from the mobile terminal, and
        displaying the second content item at the first portion of the screen of the display device in association with the first content item.

4. The method of claim 2, wherein receiving, from the mobile terminal, a second content item comprises:
    determining that the first portion of the screen of the display device is not displaying the representation of the first content item, and
    based on determining that the first portion of the screen of the display device is not displaying the representation of the first content item,
        receiving the second content item from the mobile terminal, and
        displaying the second content item at the first portion of the screen of the display device.

5. The method of claim 2,
    wherein transmitting, to the mobile terminal, a first content item which is displayed at the first portion of the screen of the display device comprises:
        based on a determination that the first portion of the screen of the display device is displaying the representation of the first content item, transmitting, to the mobile terminal, the first content item of which representation is being displayed at the first portion of the screen of the display device, and based on a determination that the first portion of the screen of the display device is not displaying the representation of the first content item, transmitting, to the mobile terminal, the first content item which is moved to the first portion of the screen of the display device from a second portion of the screen of the display device by a user input.

6. The method of claim 5, wherein transmitting, to the mobile terminal, a first content item which is displayed at the first portion of the screen of the display device further comprises:
performing a copy operation, wherein the copy operation comprises copying the first content item from a storage unit of the display device to the mobile terminal.

7. The method of claim 5, wherein transmitting, to the mobile terminal, a first content item which is displayed at the first portion of the screen of the display device further comprises:
performing a cut operation, wherein the cut operation comprises removing the display of the representation of the first content item from the first portion of the screen of the display device.

8. The method of claim 5, wherein transmitting, to the mobile terminal, a first content item which is displayed at the first portion of the screen of the display device further comprises:
transmitting a copy of the first content item from the display device to the mobile terminal, and
deleting the first content item from a storage unit of the display device immediately after the first content item is transmitted to the mobile terminal.

9. The method of claim 1, wherein the content data comprises at least one of video, text, audio, a photograph, a document file, a game, a representation of a telephone call or a video call, and a software application.

10. The method of claim 1, wherein determining the first portion of the screen of the display device where the mobile terminal is locationally proximate with the display device comprises detecting a touch location of the display device where a rear side of the mobile terminal touches the display device.

11. The method of claim 1, wherein determining the first portion of the screen of the display device where the mobile terminal is locationally proximate with the display device comprises determining a touch location of the mobile terminal with respect to the first portion of the screen of the display device by using at least one of a touch sensor, an Near Field Communication (NFC) tag, and a catadioptric camera in the display device.

12. A system comprising:
a processor;
one or more instructions encoded in a non-transitory computer-readable medium for execution by the processor, and when executed cause the processor to perform operations including:
facilitating wireless communications between a mobile terminal and a display device;
determining whether the mobile terminal and the display device that is physically distinct of the mobile terminal are locationally proximate;
based on a determination that the mobile terminal and the display device are locationally proximate, identifying a first portion of a screen of the display device where the mobile terminal has a high locational proximity relative to at least one other portion of the screen;
based on a determination that the mobile terminal and the display device are locationally proximate, determining a side of the mobile terminal that faces the screen of the display device, wherein the side of the mobile terminal that faces the screen of the display device is either a first side of the mobile terminal exposing a screen of the mobile terminal or a second side of the mobile terminal that is an opposite side of the first side;
based on determining the side of the mobile terminal that faces the screen of the display device, determining a data transfer direction among at least a first data transfer direction from the display device to the mobile terminal and a second data transfer direction from the mobile terminal to the display device; and
processing content data based on the determined data transfer direction,
wherein processing content data based on the determined data transfer direction comprises:
based on the determined data transfer direction being the first data transfer direction, transmitting, to the mobile terminal, a first content item which is displayed at the first portion of the display device, and based on the determined data transfer direction being the second data transfer direction, receiving, from the mobile terminal, a second content item.

13. The computer program product of claim 12, wherein transmitting, to the mobile terminal, a first content item which is displayed at the first portion of the screen of the display device comprises:
based on a determination that the first portion of the screen of the display device is displaying the representation of the first content item, transmitting, to the mobile terminal, the first content item of which representation is being displayed at the first portion of the screen of the display device, and
based on a determination that the first portion of the screen of the display device is not displaying the representation of the first content item, transmitting, to the mobile terminal, the first content item which is moved to the first portion of the screen of the display device from a second portion of the screen of the display device by a user input.

14. A display device comprising:
a network interface configured to establish a network connection between a mobile terminal and a display device;
a sensing unit configured to determine whether the mobile terminal and the display device that is physically distinct of the mobile terminal are locationally proximate;
a screen portion of the display device configured to display a representation of content data, and
a control unit configured to process operations including:
determining whether the mobile terminal and the display device that is physically distinct of the mobile terminal are locationally proximate;
based on a determination that the mobile terminal and the display device are locationally proximate, identifying a first portion of a screen of the display device where the mobile terminal has a high locational proximity relative to at least one other portion of the screen;
based on a determination that the mobile terminal and the display device are locationally proximate, determining a side of the mobile terminal that faces the screen of the display device, wherein the side of the mobile terminal that faces the screen of the display device is either a first side of the mobile terminal exposing a screen of the mobile terminal or a second side of the mobile terminal that is an opposite side of the first side;

based on determining the side of the mobile terminal that faces the screen of the display device, determining a data transfer direction among at least a first data transfer direction from the display device to the mobile terminal and a second data transfer direction from the mobile terminal to the display device; and processing content data based on the determined data transfer direction, wherein processing content data based on the determined data transfer direction comprises:

based on the determined data transfer direction being the first data transfer direction, transmitting, to the mobile terminal, a first content item which is displayed at the first portion of the display device, and based on the determined data transfer direction being the second data transfer direction, receiving, from the mobile terminal, a second content item.

15. The display device of claim 14, wherein the content data comprises at least one of video, text, audio, a photograph, a document file, a game, a representation of a telephone call or a video call, and a software application.

* * * * *